(12) United States Patent
Betz et al.

(10) Patent No.: US 7,991,797 B2
(45) Date of Patent: Aug. 2, 2011

(54) ID PERSISTENCE THROUGH NORMALIZATION

(75) Inventors: Jonathan T. Betz, Summit, NJ (US); Andrew W. Hogue, Ho Ho Kus, NJ (US)

(73) Assignee: Google Inc., Mountain View, CA (US)

(*) Notice: Subject to any disclaimer, the term of this patent is extended or adjusted under 35 U.S.C. 154(b) by 345 days.

(21) Appl. No.: 11/356,842

(22) Filed: Feb. 17, 2006

(65) Prior Publication Data
US 2007/0198577 A1    Aug. 23, 2007

(51) Int. Cl.
G06F 7/00 (2006.01)
G06F 17/30 (2006.01)
G06F 17/00 (2006.01)

(52) U.S. Cl. ......................................... 707/803; 706/50
(58) Field of Classification Search ............... 707/103 R; 706/48, 50
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | 395/600 |
| 5,440,730 A * | 8/1995 | Elmasri et al. | 1/1 |
| 5,475,819 A | 12/1995 | Miller et al. | |
| 5,519,608 A | 5/1996 | Kupiec | 364/419.08 |
| 5,560,005 A | 9/1996 | Hoover et al. | |
| 5,574,898 A | 11/1996 | Leblang et al. | |
| 5,680,622 A | 10/1997 | Even | 395/709 |
| 5,694,590 A | 12/1997 | Thuraisingham et al. | 395/600 |
| 5,701,470 A | 12/1997 | Joy et al. | 395/614 |
| 5,717,911 A | 2/1998 | Madrid et al. | 395/602 |
| 5,717,951 A | 2/1998 | Yabumoto | 395/831 |
| 5,778,378 A | 7/1998 | Rubin | 707/103 |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 395/200.48 |

(Continued)

FOREIGN PATENT DOCUMENTS

| | | |
|---|---|---|
| WO | WO 01/27713 A2 | 4/2001 |
| WO | WO 2004/114163 A2 | 12/2004 |
| WO | WO 2006/104951 A1 | 10/2006 |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.

(Continued)

Primary Examiner — Pierre M Vital
Assistant Examiner — Sabana Rahman
(74) Attorney, Agent, or Firm — Morgan, Lewis & Bockius LLP

(57) ABSTRACT

A system and method for maintaining persistent object identifiers across versions of a collection of data. According to one embodiment of the present invention, a first collection of objects is compared to a second collection of objects. If an object in the first collection matches an object in the second collection, a reference is added to the object in the first collection referring to the object in the second collection, allowing the identifier to persist in both collections of objects. Additionally, according to one embodiment of the present invention, the data (or "facts") associated with the object from the first collection are moved to the object from the second collection. In this way, data associated with matching objects is combined between two collections of objects while maintaining persistent object identifiers.

18 Claims, 14 Drawing Sheets

U.S. PATENT DOCUMENTS

| | | | |
|---|---|---|---|
| 5,815,415 A * | 9/1998 | Bentley et al. | 703/4 |
| 5,819,210 A | 10/1998 | Maxwell, III et al. | 704/9 |
| 5,819,265 A | 10/1998 | Ravin et al. | 707/5 |
| 5,822,743 A | 10/1998 | Gupta et al. | 706/50 |
| 5,826,258 A | 10/1998 | Gupta et al. | 707/4 |
| 5,909,689 A * | 6/1999 | Van Ryzin | 1/1 |
| 5,920,859 A | 7/1999 | Li | 707/5 |
| 5,943,670 A | 8/1999 | Prager | 707/5 |
| 5,956,718 A | 9/1999 | Prasad et al. | 707/10 |
| 5,974,254 A * | 10/1999 | Hsu | 717/109 |
| 5,987,460 A | 11/1999 | Niwa et al. | 707/6 |
| 6,018,741 A | 1/2000 | Howland et al. | 707/102 |
| 6,044,366 A | 3/2000 | Graffe et al. | 707/2 |
| 6,052,693 A | 4/2000 | Smith et al. | 707/104 |
| 6,078,918 A | 6/2000 | Allen et al. | 707/6 |
| 6,112,203 A | 8/2000 | Bharat et al. | 707/5 |
| 6,112,210 A | 8/2000 | Nori et al. | 707/103 |
| 6,122,647 A | 9/2000 | Horowitz et al. | 707/513 |
| 6,134,555 A | 10/2000 | Chadha et al. | 707/102 |
| 6,138,270 A | 10/2000 | Hsu | 717/3 |
| 6,212,526 B1 | 4/2001 | Chaudhuri et al. | 707/102 |
| 6,240,546 B1 | 5/2001 | Lee et al. | 717/4 |
| 6,263,328 B1 | 7/2001 | Coden et al. | 707/3 |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 | 5/2002 | Lamburt et al. | 707/203 |
| 6,473,898 B1 | 10/2002 | Waugh et al. | 717/168 |
| 6,502,102 B1 | 12/2002 | Haswell et al. | 707/102 |
| 6,556,991 B1 | 4/2003 | Borkovsky | 707/6 |
| 6,567,936 B1 | 5/2003 | Yang et al. | 714/37 |
| 6,572,661 B1 | 6/2003 | Stern | 715/501.1 |
| 6,584,464 B1 | 6/2003 | Warthen | 707/4 |
| 6,606,625 B1 | 8/2003 | Muslea et al. | 707/6 |
| 6,606,659 B1 | 8/2003 | Hegli et al. | 709/225 |
| 6,609,123 B1 * | 8/2003 | Cazemier et al. | 707/4 |
| 6,656,991 B2 | 12/2003 | Staccione et al. | 524/430 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 715/501.1 |
| 6,745,189 B2 | 6/2004 | Schreiber | 707/10 |
| 6,754,873 B1 | 6/2004 | Law et al. | 715/501.1 |
| 6,799,176 B1 | 9/2004 | Page | 707/5 |
| 6,804,667 B1 | 10/2004 | Martin | 707/6 |
| 6,820,081 B1 | 11/2004 | Kawai et al. | 707/7 |
| 6,823,495 B1 | 11/2004 | Vedula et al. | 715/805 |
| 6,850,896 B1 | 2/2005 | Kelman et al. | 705/10 |
| 6,886,005 B2 | 4/2005 | Davis | 707/2 |
| 6,901,403 B1 | 5/2005 | Bata et al. | 707/101 |
| 6,957,213 B1 | 10/2005 | Yuret | 707/4 |
| 6,963,880 B1 | 11/2005 | Pingte et al. | 707/103 R |
| 7,003,522 B1 | 2/2006 | Reynar et al. | 707/10 |
| 7,003,719 B1 | 2/2006 | Rosenoff et al. | 715/500.1 |
| 7,020,662 B2 | 3/2006 | Boreham et al. | 707/104.1 |
| 7,051,023 B2 | 5/2006 | Kapur et al. | 707/5 |
| 7,080,073 B1 | 7/2006 | Jiang et al. | 707/7 |
| 7,080,085 B1 | 7/2006 | Choy et al. | 707/101 |
| 7,143,099 B2 | 11/2006 | Lecheler-Moore et al. | 707/101 |
| 7,146,536 B2 * | 12/2006 | Bingham et al. | 714/26 |
| 7,162,499 B2 | 1/2007 | Lees et al. | 707/203 |
| 7,194,380 B2 | 3/2007 | Barrow et al. | 702/181 |
| 7,197,449 B2 | 3/2007 | Hu et al. | 704/9 |
| 7,277,879 B2 | 10/2007 | Varadarajan | 707/1 |
| 7,305,380 B1 | 12/2007 | Hoelzle et al. | 707/3 |
| 7,363,312 B2 | 4/2008 | Goldsack | 707/102 |
| 7,472,182 B1 | 12/2008 | Young et al. | 709/224 |
| 7,483,829 B2 | 1/2009 | Murakami et al. | 704/10 |
| 7,493,317 B2 | 2/2009 | Geva | 707/3 |
| 7,797,282 B1 | 9/2010 | Kirshenbaum et al. | 707/651 |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 | 6/2002 | Davis | 707/500.1 |
| 2002/0083039 A1 | 6/2002 | Ferrari et al. | 707/1 |
| 2002/0087567 A1 | 7/2002 | Spiegler et al. | 707/100 |
| 2002/0147738 A1 | 10/2002 | Reader | 707/500 |
| 2002/0169770 A1 | 11/2002 | Kim et al. | 707/5 |
| 2002/0178448 A1 | 11/2002 | Te Kiefte et al. | 725/46 |
| 2002/0194172 A1 | 12/2002 | Schreiber | 707/4 |
| 2003/0018652 A1 | 1/2003 | Heckerman et al. | 707/104.1 |
| 2003/0058706 A1 | 3/2003 | Okamoto et al. | 365/200 |
| 2003/0078902 A1 | 4/2003 | Leong et al. | 706/59 |
| 2003/0120644 A1 | 6/2003 | Shirota | 707/3 |
| 2003/0120675 A1 | 6/2003 | Stauber et al. | 707/100 |
| 2003/0126102 A1 | 7/2003 | Borthwick | 706/21 |
| 2003/0149567 A1 | 8/2003 | Schmitz et al. | 704/270 |
| 2003/0154071 A1 | 8/2003 | Shreve | |
| 2003/0177110 A1 | 9/2003 | Okamoto et al. | 707/3 |
| 2003/0182310 A1 | 9/2003 | Charnock et al. | 707/104.1 |
| 2003/0195877 A1 | 10/2003 | Ford et al. | 707/3 |
| 2003/0196052 A1 | 10/2003 | Bolik et al. | 711/162 |
| 2004/0003067 A1 | 1/2004 | Ferrin | 709/223 |
| 2004/0024739 A1 | 2/2004 | Copperman et al. | 707/1 |
| 2004/0064447 A1 | 4/2004 | Simske et al. | 707/5 |
| 2004/0088292 A1 | 5/2004 | Dettinger et al. | 707/4 |
| 2004/0107125 A1 | 6/2004 | Guheen et al. | |
| 2004/0122844 A1 | 6/2004 | Malloy et al. | 707/102 |
| 2004/0123240 A1 | 6/2004 | Gerstl et al. | 715/513 |
| 2004/0128624 A1 | 7/2004 | Arellano et al. | 715/530 |
| 2004/0143600 A1 | 7/2004 | Musgrove et al. | 707/104.1 |
| 2004/0153456 A1 | 8/2004 | Charnock et al. | 707/10 |
| 2004/0167870 A1 | 8/2004 | Wakefield et al. | 707/1 |
| 2004/0177015 A1 | 9/2004 | Galai et al. | 705/35 |
| 2004/0199923 A1 | 10/2004 | Russek | 719/310 |
| 2004/0255237 A1 | 12/2004 | Tong | 715/501.1 |
| 2004/0260979 A1 | 12/2004 | Kumai | 714/37 |
| 2004/0267700 A1 | 12/2004 | Dumais et al. | 707/2 |
| 2005/0076012 A1 | 4/2005 | Manber et al. | 707/3 |
| 2005/0086211 A1 | 4/2005 | Mayer | 707/3 |
| 2005/0086222 A1 | 4/2005 | Wang et al. | 707/5 |
| 2005/0097150 A1 | 5/2005 | McKeon et al. | 707/202 |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone | 707/3 |
| 2005/0240615 A1 | 10/2005 | Barsness et al. | 707/102 |
| 2005/0256825 A1 | 11/2005 | Dettinger et al. | 707/1 |
| 2006/0036504 A1 | 2/2006 | Allocca et al. | 705/26 |
| 2006/0041597 A1 | 2/2006 | Conrad et al. | 707/200 |
| 2006/0047838 A1 | 3/2006 | Chauhan | |
| 2006/0053171 A1 | 3/2006 | Eldridge et al. | 707/203 |
| 2006/0053175 A1 | 3/2006 | Gardner et al. | 707/203 |
| 2006/0074824 A1 | 4/2006 | Li | 706/20 |
| 2006/0074910 A1 | 4/2006 | Yun et al. | 707/7 |
| 2006/0085465 A1 | 4/2006 | Nori et al. | 707/101 |
| 2006/0136585 A1 | 6/2006 | Mayfield et al. | 709/224 |
| 2006/0143227 A1 * | 6/2006 | Helm et al. | 707/103 Y |
| 2006/0143603 A1 | 6/2006 | Kalthoff et al. | 717/172 |
| 2006/0152755 A1 | 7/2006 | Curtis et al. | 358/1.15 |
| 2006/0238919 A1 | 10/2006 | Bradley | 360/128 |
| 2006/0248045 A1 | 11/2006 | Toledano et al. | 707/2 |
| 2006/0248456 A1 | 11/2006 | Bender et al. | 715/531 |
| 2006/0253418 A1 | 11/2006 | Charnock et al. | 707/1 |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 R |
| 2007/0016890 A1 | 1/2007 | Brunner et al. | 717/107 |
| 2007/0038610 A1 | 2/2007 | Omoigui | 707/3 |
| 2007/0073768 A1 | 3/2007 | Goradia | 707/104.1 |
| 2007/0094246 A1 | 4/2007 | Dill et al. | 707/4 |
| 2007/0130123 A1 | 6/2007 | Majumder | 707/3 |
| 2007/0143317 A1 | 6/2007 | Hogue et al. | 707/100 |
| 2007/0150800 A1 | 6/2007 | Betz et al. | 715/500 |
| 2007/0198480 A1 | 8/2007 | Hogue et al. | 707/3 |
| 2007/0203867 A1 | 8/2007 | Hogue et al. | 706/48 |
| 2007/0271268 A1 | 11/2007 | Fontoura et al. | 707/6 |
| 2008/0071739 A1 | 3/2008 | Kumar et al. | 707/3 |
| 2009/0006359 A1 | 1/2009 | Liao | 707/5 |

OTHER PUBLICATIONS

Brin, S., "Extracting Patterns and Relations from the World Wide Web," 12 pages.

Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.
Guha, R., "Object Co-identification on the Semantic Web," WWW2004, ACM, May 17-22, 2004, 9 pages.
Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.
"Information Entropy—Wikipedia, the free encyclopedia," [online] [Retrieved on May 3, 2006] Retrieved from the Internet<URL:http://en.wikipedia.org/wiki/Information_entropy>.
"Information Theory—Wikipedia, the free encyclopedia," [online] [Retrieved on May 3, 2006] Retrieved from the Internet<URL:http://en.wikipedia.org/wiki/Information_theory>.
Jones, R. et al., "Bootstrapping for Text Learning Tasks," 12 pages.
Kosseim, L, et al., "Answer Formulation for Question-Answering," 11 pages.
Liu, B. et al., "Mining Data Records in Web Pages," Conference '00, ACM, 2000, pp. 1-10.
McCallum, A. et al., "Object Consolodation by Graph Partitioning with a Conditionally-Trained Distance Metric," SIGKDD '03, ACM, Aug. 24-27, 2003, 6 pages.
Mihalcea, R. et al., "PageRank on Semantic Networks, with Application to Word Sense Disambiguation," 7 pages.
Mihalcea, R. et al., "TextRank: Bringing Order into Texts," 8 pages.
PCT International Search Report and Written Opinion, PCT/US06/07639, Sep. 13, 2006, 6 pages.
Prager, J. et al., "IBM's Piquant in TREC2003," 10 pages.
Prager, J. et al., "Question Answering using Constraint Satisfaction: QA-by-Dossier-with-Constraints," 8 pages.
Ramakrishnan, G. et al., "Is Question Answering an Acquired Skill?", WWW2004, ACM, May 17, 2004, pp. 111-120.
Agichtein, *Snowball: Extracting Relations from Large Plain-Text Collections*, Columbia University Computer Science Dept. Technical Report CUCS-033-99, Dec. 1999, pp. 1-13.
Andritsos, *Information-Theoretic Tools for Mining Database Structure from Large Data Sets*, ACM SIGMOD 2004, Jun. 13-18, 2004, 12 pages.
Brin, *The Anatomy of a Large-Scale Hypertextual Web Search Engine*, 7th International World Wide Web Conference, Brisbane, Australia, Apr. 14-18, 1998, pp. 1-26.
Bunescu, *Using Encyclopedic Knowledge for Named Entity Disambiguation*, Department of Computer Sciences, University of Texas at Austin, retrieved from internet Dec. 28, 2006, 8 pages.
Chen, *A Scheme for Inference Problems Using Rough Sets and Entropy*, Department of Computer Science, Lakehead University, Thunder Bay, ON, Canada, Springer-Verlag Berlin Heidelberg, 2005, pp. 558-567.
Cover, *Entropy, Relative Entropy and Mutual Information*, Chapter 2 of Elements of Information Theory, Wiley-InterScience, New York, NY, 1991, pp. 12-23.
Craswell, *Effective Site Finding using Link Anchor Information*, SIGIR '01, New Orleans, LA, Sep. 9-12, 2001, pp. 250-257.
Dong, *Reference Reconciliation in Complex Information Spaces*, SIGACM-SIGMOD, Baltimore, MD, 2005, 12 pages.
Downey, *Learning Text Patterns for Web Information Extraction and Assessment*, American Association for Artificial Intelligence, 2002, 6 pages.
Gao, *Learning Information Extraction Patterns from Tabular Web Pages Without Manual Labelling*, Proceedings of IEEE/WIC Int'l Conf. on Web Intelligence (WI'03), Oct. 13-17, 2003, pp. 495-498.
Gray, *Entropy and Information*, Chapter 2 of Entropy and Information Theory, Springer-Verlag, New York, NY, 1990, pp. 17-46.
Haveliwala, *Topic-Sensitive PageRank*, WWW2002, Honolulu, HI, May 7-11, 2002, pp. 1-23.
International Search Report and Written Opinion, PCT/US07/61156, Feb. 11, 2008, 7 pages.
International Search Report and Written Opinion, PCT/US2006/019807, Dec. 18, 2006, 10 pages.
Jeh, *Scaling Personalized Web Search*, WWW2003, Budapest, Hungary, May 20-24, 2003, pp. 1-24.
Ji, *Re-Ranking Algorithms for Name Tagging*, Workshop on Computationally Hard Problems and Joint Inference in Speech and Language Processing, New York University, NY, Jun. 2006, 8 pages.
Koeller, *Approximate Matching of Textual Domain Attributes for Information Source Integration*, IQIS2005, Baltimore, MD, Jun. 17, 2005, pp. 77-86.
Kolodner, *Indexing and Retrieval Strategies for Natural Language Fact Retrieval*, ACM Transactions on Database Systems, vol. 8, No. 3, Sep. 1983, pp. 434-464.
Mackay, *Probability, Entropy, and Inference*, Chapter 2 of Information Theory, Inference, and Learning Algorithms, Cambridge University Press 2003, Version 7.2, Mar. 28, 2005, pp. 22-33 and 138-140.
Mann, *Unsupervised Personal Name Disambiguation*, Department of Computer Science, Johns Hopkins University, Baltimore, MD, Proceedings of the Seventy Conference on Natural Language Learning at HLT-NAACL, 2003, 8 pages.
Merriam Webster Dictionary defines "normalize" as "to make conform to or reduce to a norm or standard", 1865, 2 pages.
Merriam Webster Dictionary defines "value" as "a numerical quantity that is assigned or is determined by calculation or measurement", 1300, 2 pages.
Microsoft Computer Dictionary defines "normalize" as "adjust number within specific range", May 1, 2002, 4 pages.
Microsoft Computer Dictionary Defines "quantity" as a "number", May 1, 2002, 4 pages.
Microsoft Computer Dictionary defines "value" as "a quantity", May 1, 2002, 4 pages.
Page, *The PageRank Citation Ranking: Bringing Order to the Web*, Stanford Digital Libraries Working Paper, 1998, pp. 1-17.
Pawson, *Sorting and Grouping*, www.dpawson.co.uk/xsl/sect2/N6280.html, Feb. 7, 2004, pp. 1-19.
Richardson, *Beyond Page Rank: Machine Learning for Static Ranking*, WWW2006, Edinburgh, Scotland, May 23-26, 20069 pages.
Richardson, *The Intelligent Surfer: Probabilistic Combination of Link and Content Information in PageRank*, Advances in Neural Information Processing Systems, vol. 14, MIT Press, Cambridge, MA, 2002, 8 pages.
Riloff, *Learning Dictionaries for Information Extraction by Multi-Level Bootstrapping*, AAAI-99, 1999, 6 pages.
Shannon, *A Mathematical Theory of Communication*, The Bell System Technical Journal, vol. 27, Jul.-Oct. 1948, pp. 1-55.
Sun Microsystems, *Attribute Names*, http://java.sun.com/products/jndi/tutorial/basics/directory/attrnames.html, Feb. 17, 2004, 2 pages.
Wang, *C4-2: Combining Link and Contents in Clustering Web Search Results to Improve Information Interpretation*, The University of Tokyo, Tokyo, Japan, 2002, pp. 1-9.
Wirzenius, *C Preprocessor Trick for Implementing Similar Data Types*, Jan. 17, 2000, 9 pages.

\* cited by examiner

Example Format of Facts in Repository (each fact is associated with an object ID)

Example Facts in Repository (each
fact is associated with an object ID)

Example Object
Reference Table**

Example Format of Facts in
Repository (each fact is associated
with an object ID)

Example Objects

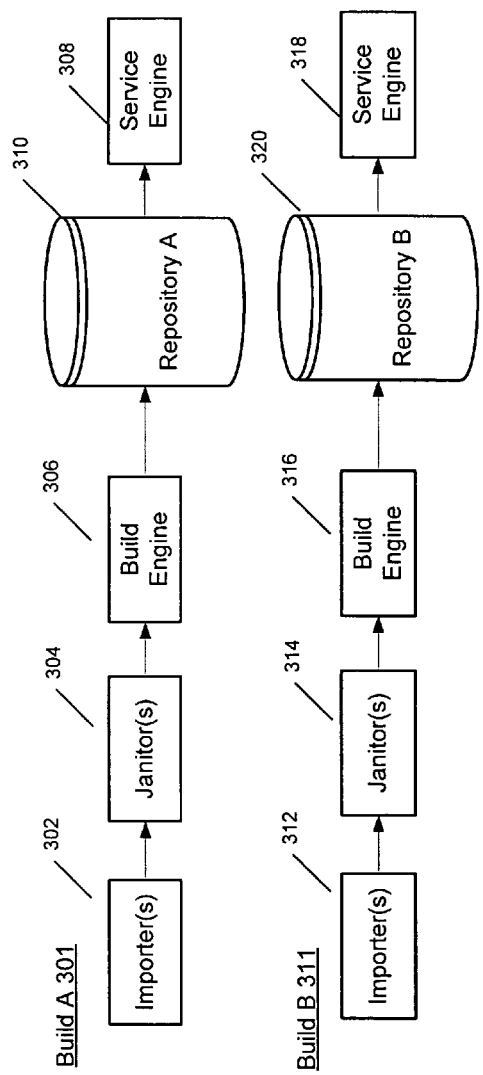
FIG. 3(a) – Unconnected builds pose persistence problem
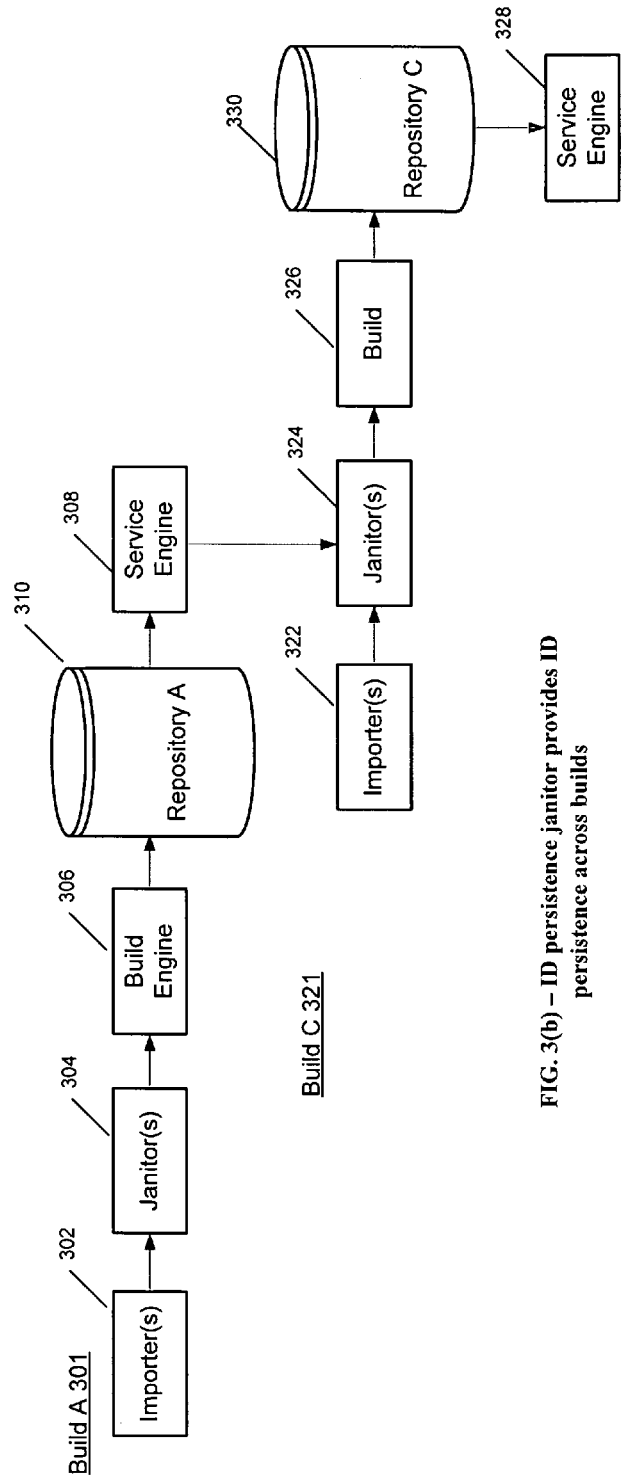
FIG. 3(b) – ID persistence janitor provides ID persistence across builds

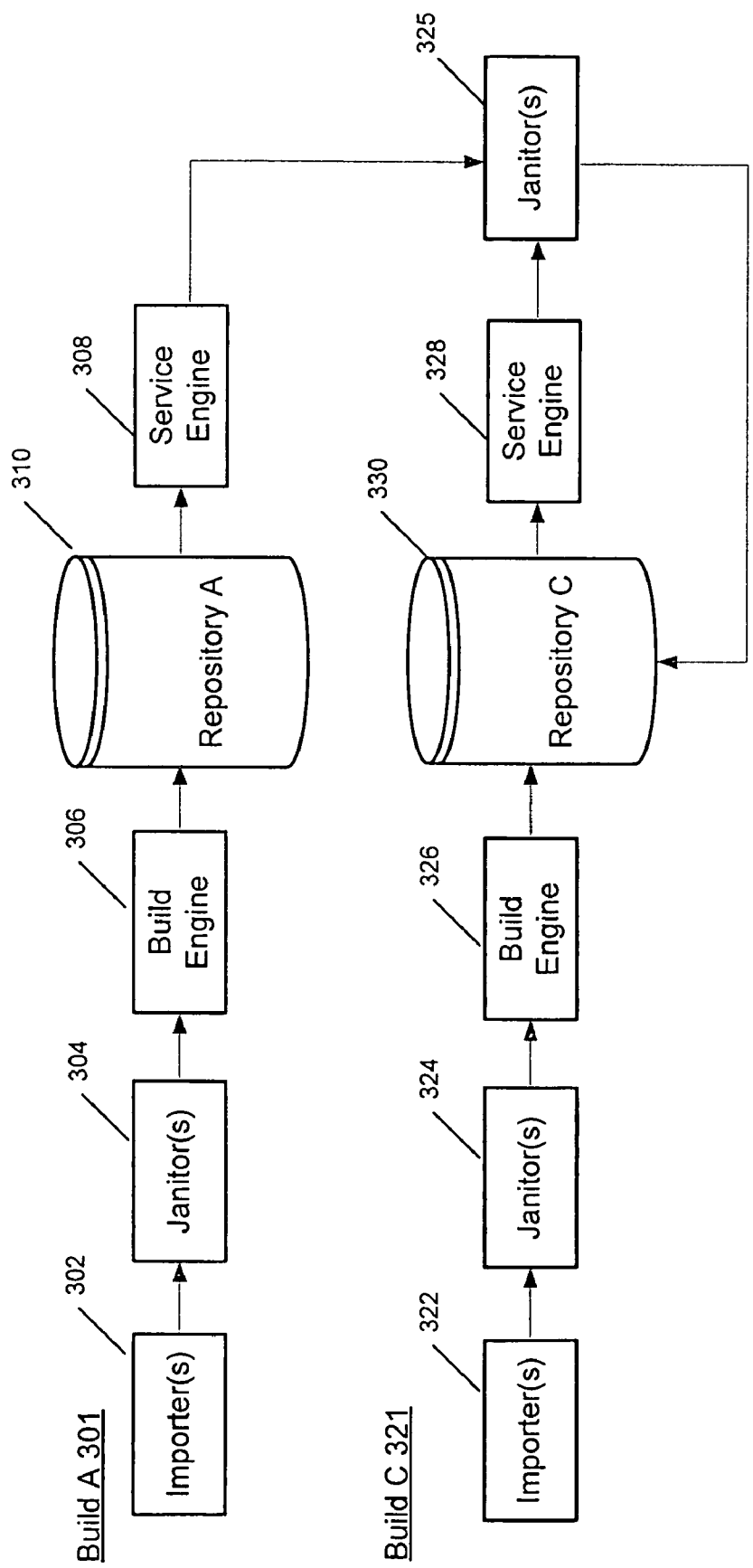
FIG. 3(c) – ID persistence janitor provides ID persistence across builds 332 New Collection of Objects    334 Old Collection of Objects
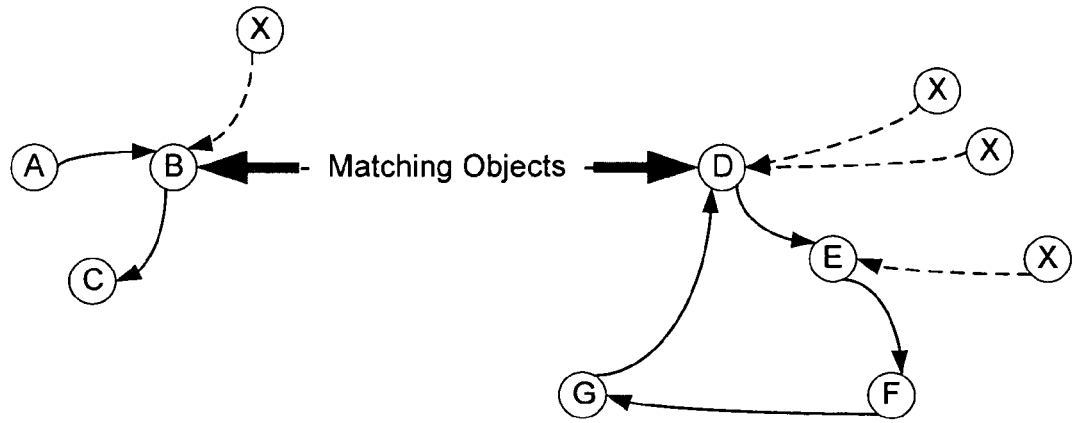
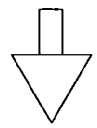
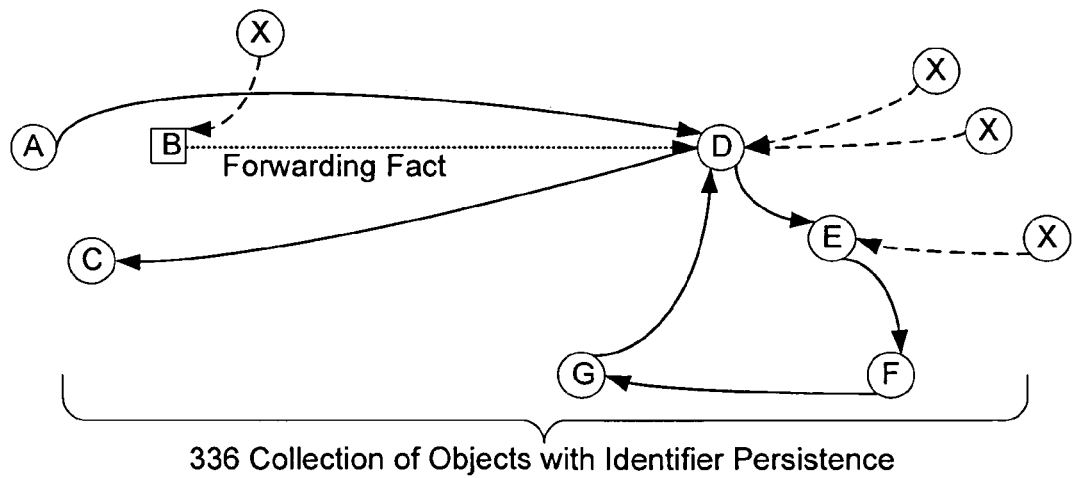
336 Collection of Objects with Identifier Persistence
FIG. 3(d) – Example of one embodiment of
ID persistence between collections of objects

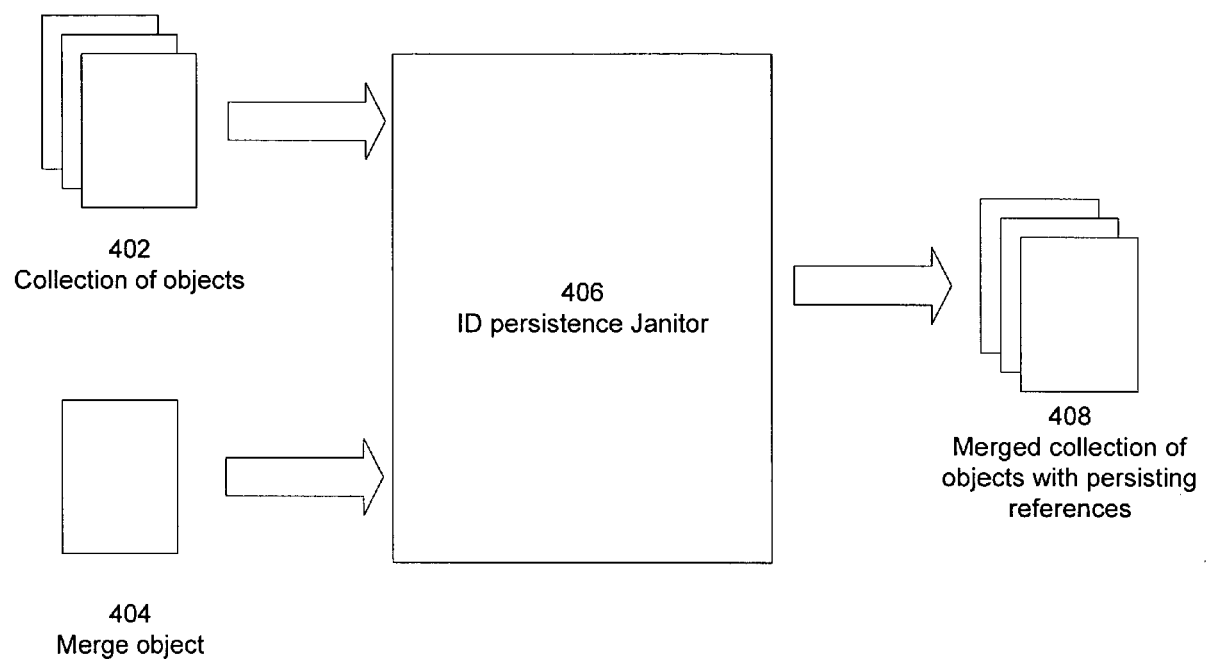
FIG. 4 – Data Flow of ID Persistence Janitor

Before - 501
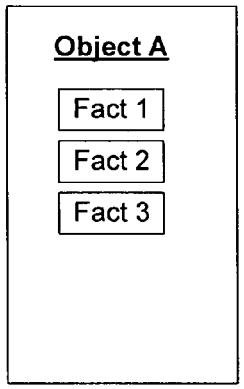
Before - 502
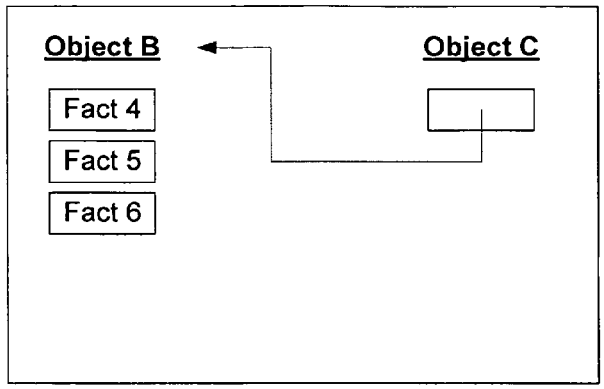
FIG. 5(a)
After - 504
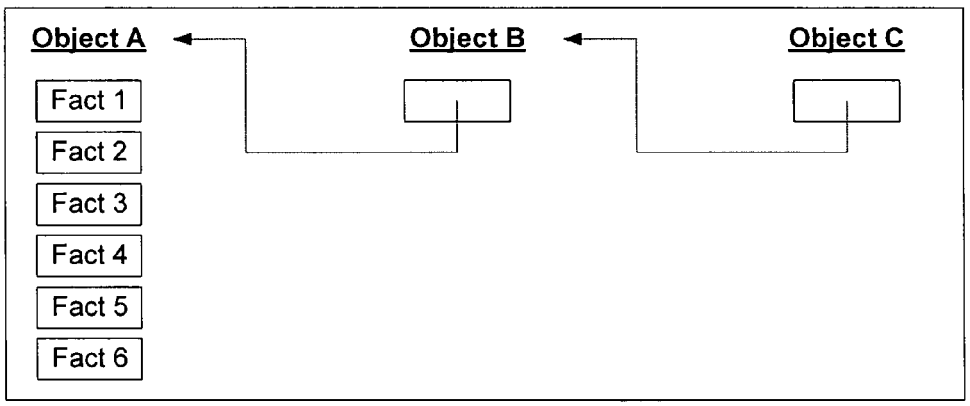
FIG. 5(b)
After – 506
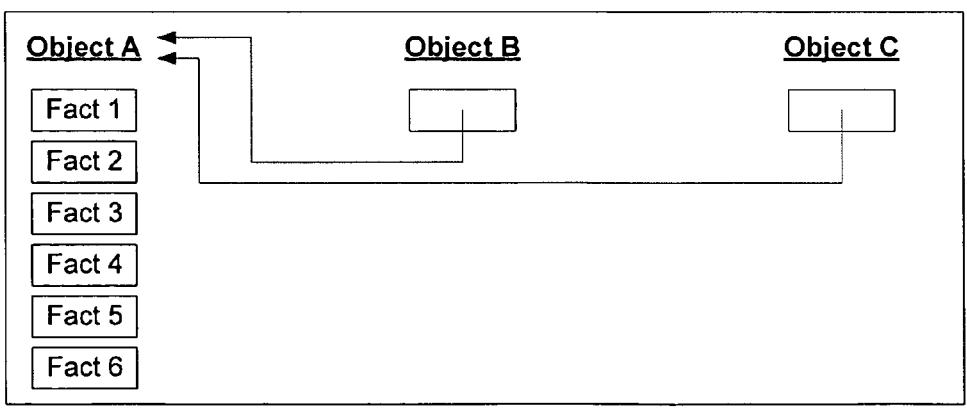
FIG. 5(c)

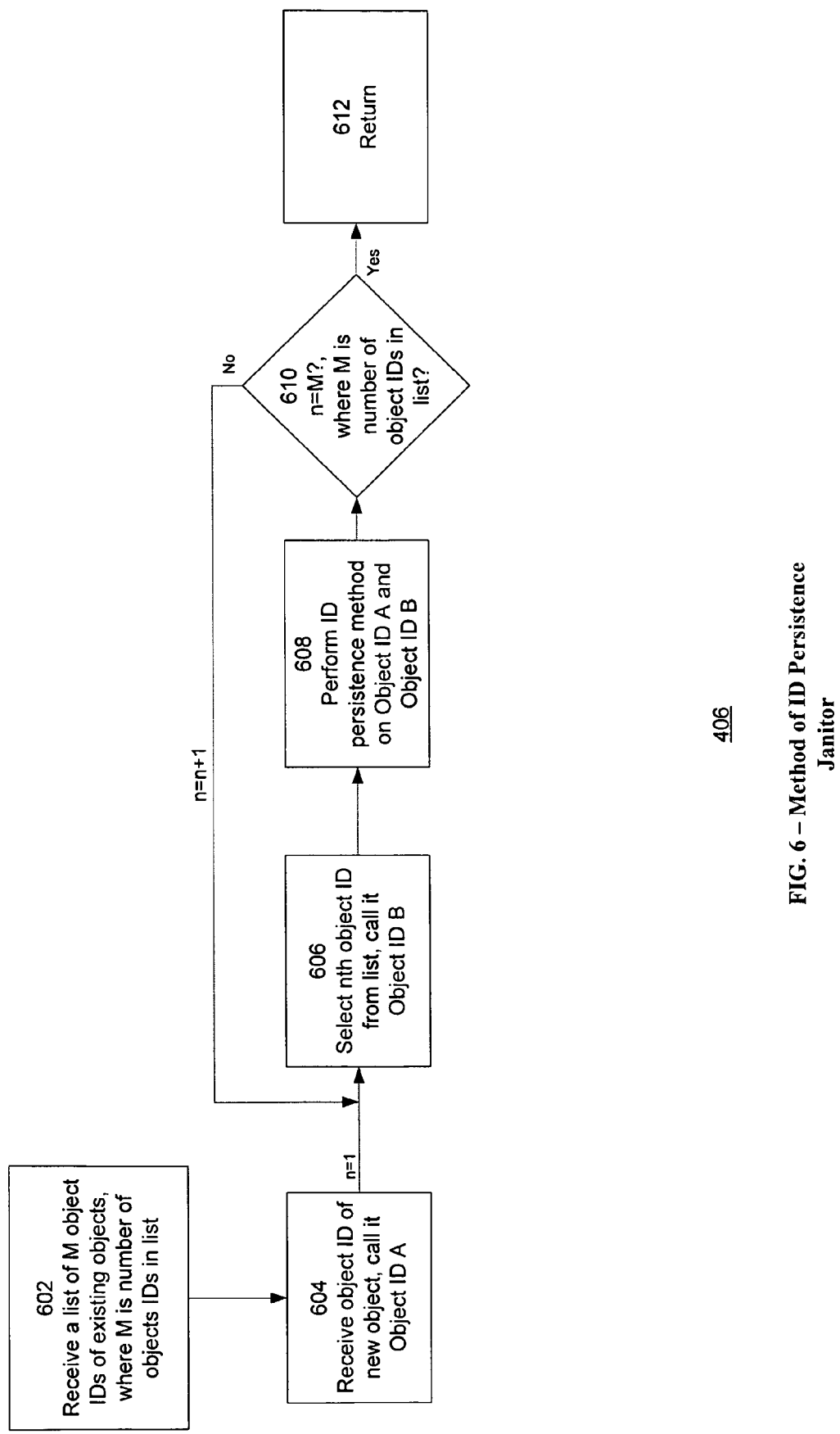
FIG. 6 – Method of ID Persistence Janitor

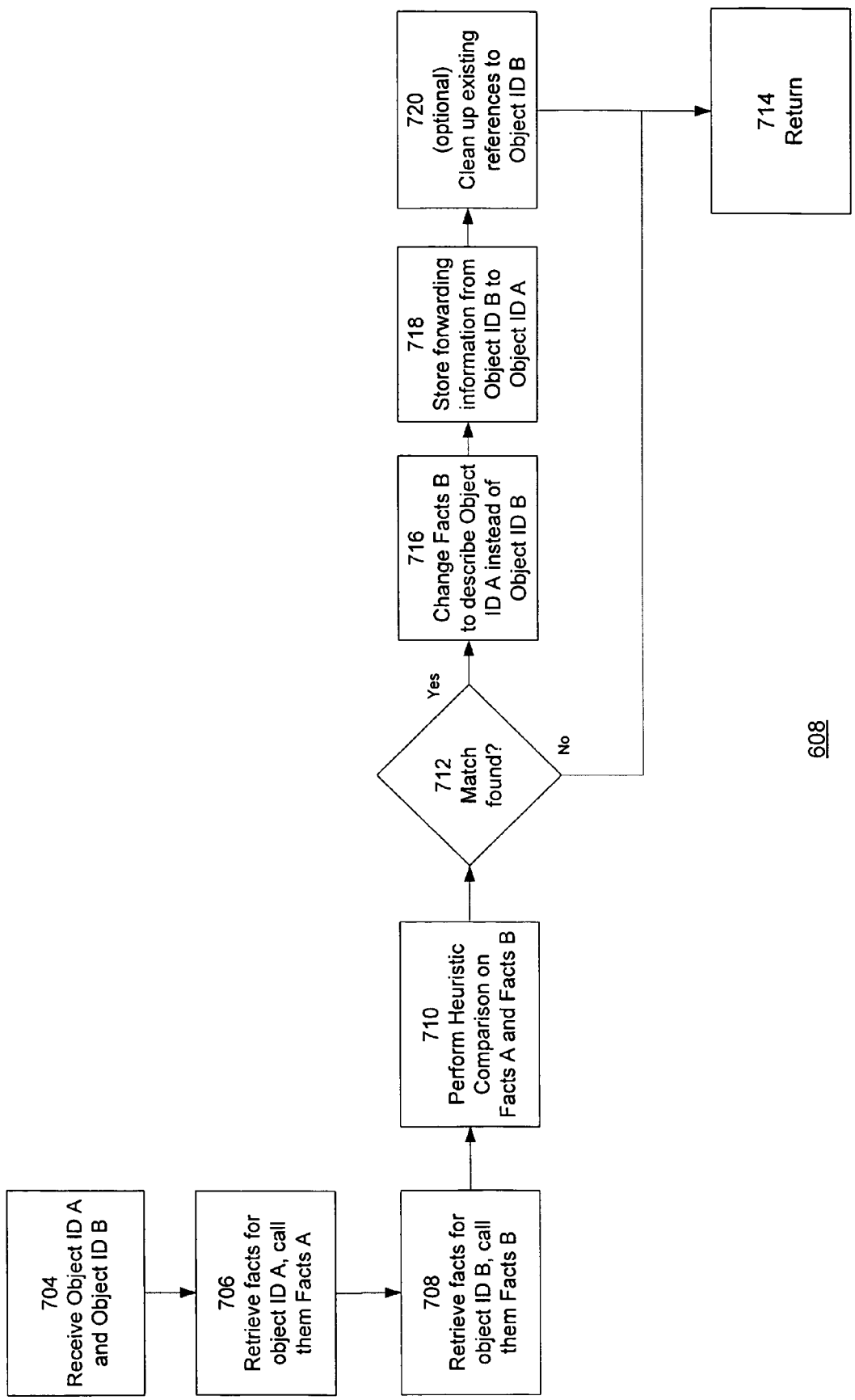
FIG. 7 – Method of ID persistence function

Matching Objects 802

FIG. 8(a)

| Object A | | Object B | |
|---|---|---|---|
| Attributes | Values | Attributes | Values |
| Gender | Male | Name | Nikolai Pavlovich |
| Birth date | 7/6/1796 | Gender | Male |
| Name | Nikolai Pavlovich | Title | Emperor of Russia |
| Title | Emperor of Russia | Title | King of Poland |
| Title | King of Poland | Birth date | 7/6/1796 |

Non-Matching Objects 804

FIG. 8(b)

| Object A | | Object B | |
|---|---|---|---|
| Attributes | Values | Attributes | Values |
| Gender | Male | Name | Margaret Hilda Thatcher |
| Birth date | 7/6/1796 | Gender | Female |
| Name | Nikolai Pavlovich | Nationality | British |
| Title | Emperor of Russia | Birthplace | Grantham, England |
| Title | King of Poland | Birth date | 10/13/1925 |

Matching Objects 806

FIG. 8(c)

| Object A | | Object B | |
|---|---|---|---|
| Attributes | Values | Attributes | Values |
| Gender | Male | Name | Nikolai I Pavlovich |
| Birth date | 7/6/1796 | Title | Emperor of Russia |
| Name | Nikolai Pavlovich | Title | Grand Duke of Finland |
| Title | Emperor of Russia | Birth date | 6/25/1796 |
| Title | King of Poland | | |

Non-Matching Objects 808

FIG. 8(d)

| Object A | | Object B | |
|---|---|---|---|
| Attributes | Values | Attributes | Values |
| Name | Nicholas II of Russia | Name | Nikolai I Pavlovich |
| Title | Emperor of Russia | Gender | Male |
| Birth date | 05/18/1868 | Title | Emperor of Russia |
| | | Title | Grand Duke of Finland |
| | | Birth date | 6/25/1796 |

ID PERSISTENCE THROUGH NORMALIZATION

CROSS REFERENCE TO RELATED APPLICATIONS

This application is related to the following U.S. Applications all of which are incorporated by reference herein:

U.S. application Ser. No. 11/357,748 entitled "Support for Object Search", filed on Feb. 17, 2006, by Alex Kehlenbeck, Andrew W. Hogue, Jonathan T. Betz;

U.S. application Ser. No. 11/342,290 entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293 entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679 entitled "Query Language", filed on Feb. 17, 2006, by Andrew W. Hogue, Doug Rhode;

U.S. application Ser. No. 11/356,837, entitled "Automatic Object Reference Identification and Linking in a Browseable Fact Repository", filed Feb. 17, 2006, by Andrew W. Hogue;

U.S. application Ser. No. 11/356,851, entitled "Browseable Fact Repository", filed on Feb. 17, 2006, by Andrew W. Hogue, Jonathan T. Betz;

U.S. application Ser. No. 11/356,728, entitled "Annotation Framework", filed Feb. 17, 2006, by Tom Richford, Jonathan T. Betz;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed Feb. 17, 2006, by Jonathan T. Betz, Farhan Shamsi;

U.S. application Ser. No. 11/356,765, entitled "Attribute Entropy as a Signal in Object Normalization", filed on Feb. 17, 2006, by Jonathan T. Betz, Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

BACKGROUND OF THE INVENTION

1. Field of the Invention

The disclosed embodiments relate generally to information storage. More particularly, the disclosed embodiments relate to maintaining consistent references across differing versions of a collection of data.

2. Description of Related Art

In a large collection of information about objects, it is frequently desirable to collect new information on an ongoing basis. When new information is collected, the new information sometimes supplements or supersedes information already stored in the information collection. To facilitate the effective retrieval of information, object identifiers are used to refer to particular objects in the collection of information. Ideally, an object identifier can be used to retrieve all of the information associated with an object regardless of when or how that information was originally collected.

Assigning a new object identifier to newly collected information results in an object identifier persistence problem when the newly collected information describes an object already in the collection. If the old object identifier is used to retrieve the information about an object, the newly collected information will not be retrieved, as the newly collected information is only associated with the new object identifier. Thus, the old object identifier fails to persist—that is, the old object identifier cannot be relied upon to accurately and completely retrieve all the available information related to its corresponding object.

Therefore, what is needed is a method for making identifiers persistent while incorporating new information into a collection.

SUMMARY OF THE INVENTION

The invention is a system and method for making identifiers persistent when new information is incorporated into a collection. According to one embodiment of the present invention, an object entity normalizer compares objects from a first collection to objects from a second collection. If an object from the first collection matches an object from the second collection, the first object is merged into the second object. An object matches another object, for example, if both objects have substantially similar facts, or if both objects refer to the same entity.

According to one embodiment of the present invention, a first collection of objects is compared to a second collection of objects. If an object in the first collection "matches" an object in the second collection, a reference is added to the object in the first collection referring to the object in the second collection, allowing the identifier to persist in both collections of objects. Additionally, according to one embodiment of the present invention, the data (or "facts") associated with the object from the first collection are moved to the object from the second collection. In this way, data associated with matching objects is combined between two collections of objects and object identifiers are made persistent.

BRIEF DESCRIPTION OF THE DRAWINGS

FIG. 3(a) is an illustration of an object ID persistence problem caused by repeated builds.

FIG. 3(b) is an illustration of the generation of two collections of information with ID persistence maintained by a janitor, according to one embodiment of the present invention.

FIG. 3(c) is an illustration of the generation of two collections of information with ID persistence maintained by a janitor, according to another embodiment of the present invention.

FIG. 3(d) is an example of how ID persistence can be achieved across collections of objects by use of a janitor, according to one embodiment of the present invention.

FIG. 4 is an illustration of the flow of data in an ID persistence janitor, according to one embodiment of the present invention.

FIGS. 5(a)-5(c) illustrate an example of maintaining persistent identifiers, according to several of the various embodiment of the present invention.

FIG. 6 is a flow chart illustrating a method for an ID persistence janitor, according to one embodiment of the present invention.

FIG. 7 is a flow chart illustrating a method for performing ID persistence, according to one embodiment of the present invention.

FIGS. 8(a)-8(d) show examples of different objects and how they might be classified by the heuristic comparison function, according to one embodiment of the present invention.

DETAILED DESCRIPTION OF THE EMBODIMENTS

Embodiments of the present invention are now described with reference to the figures where like reference numbers indicate identical or functionally similar elements.

Figure 1:
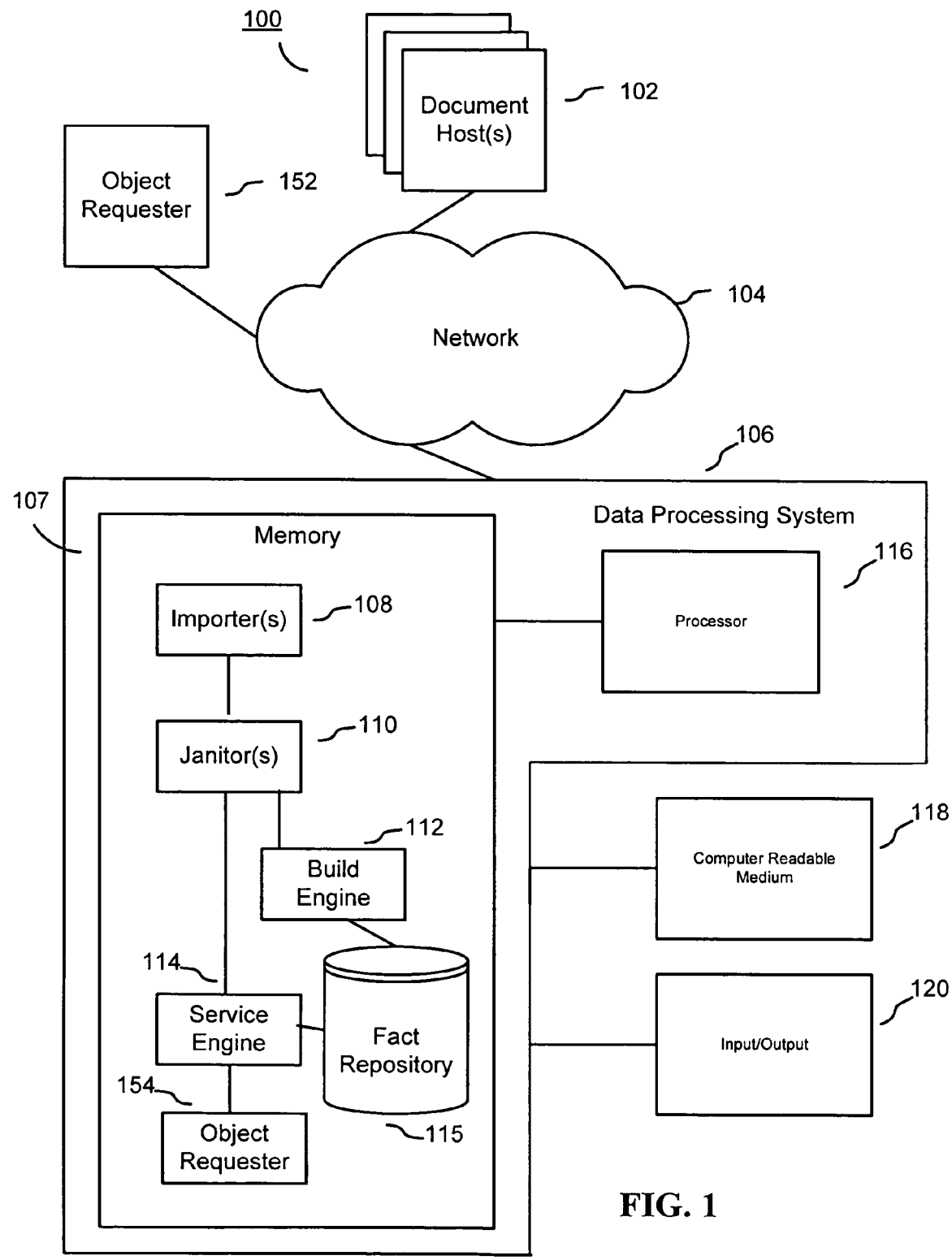
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as Birthdate by one janitor and then another janitor might notice that 12/2/1981 and December 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
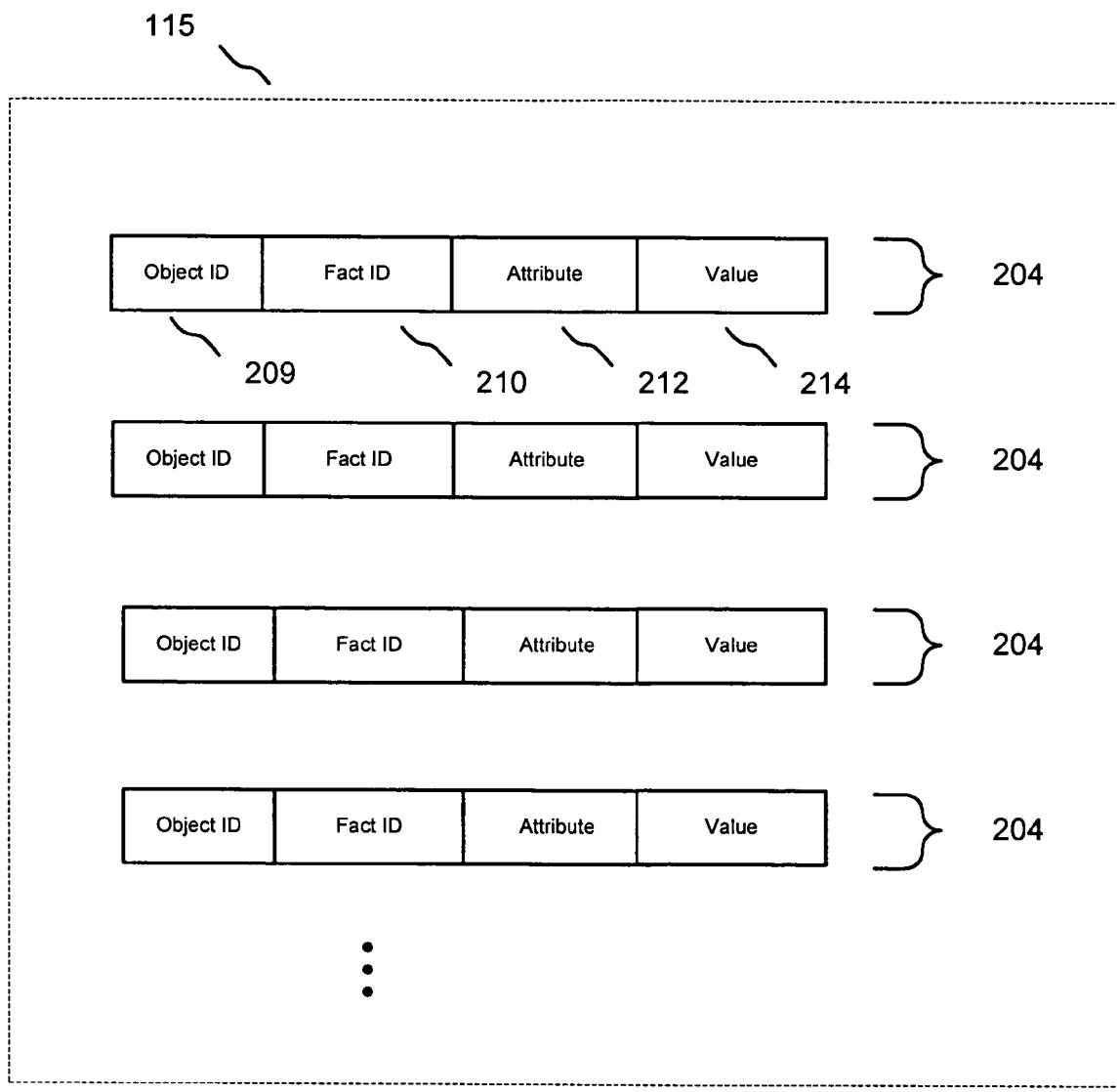
FIGS. 2(a)-2(d) are block diagrams illustrating a data structure for facts within a repository of FIG. 1. in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "February 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
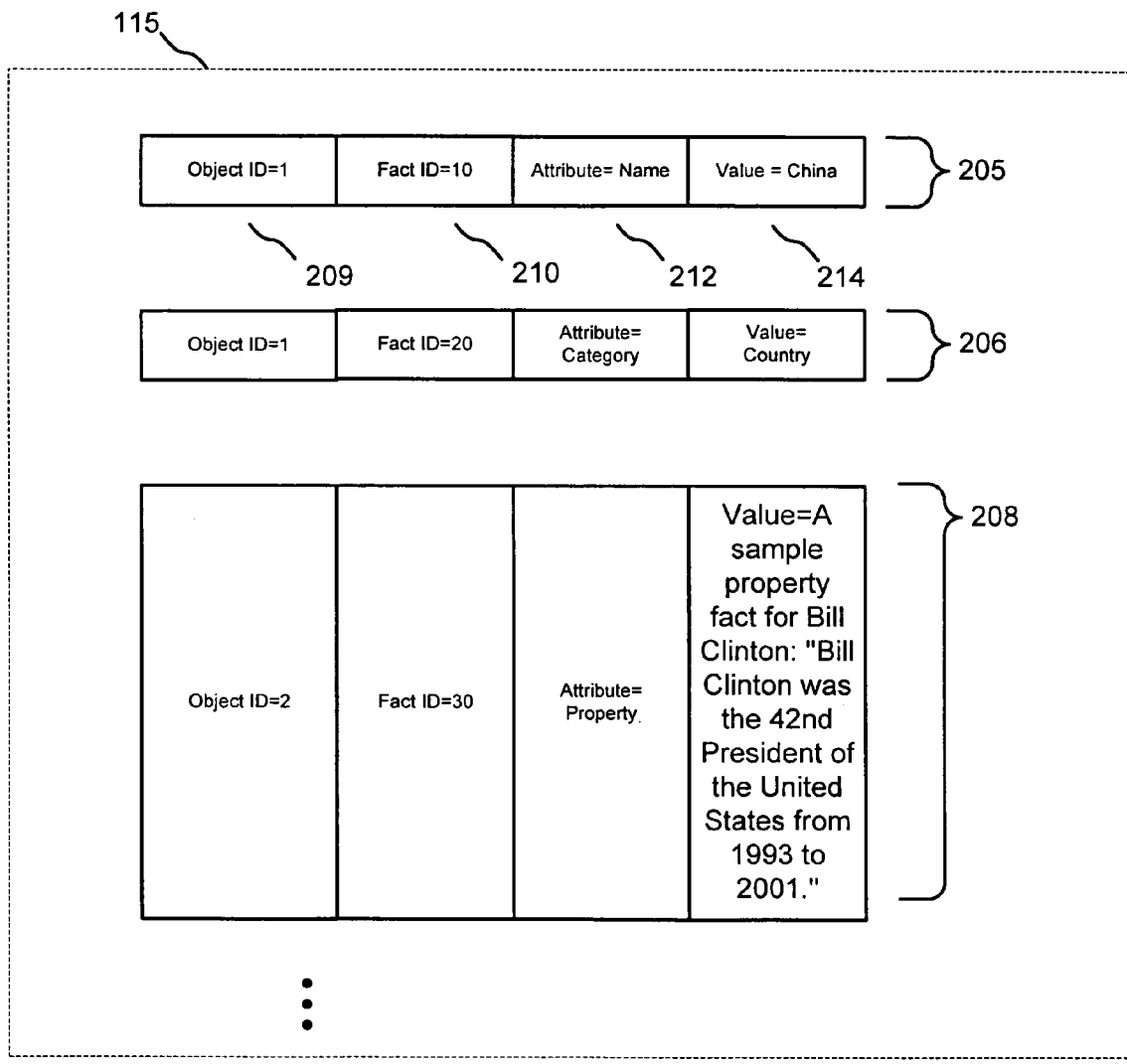

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
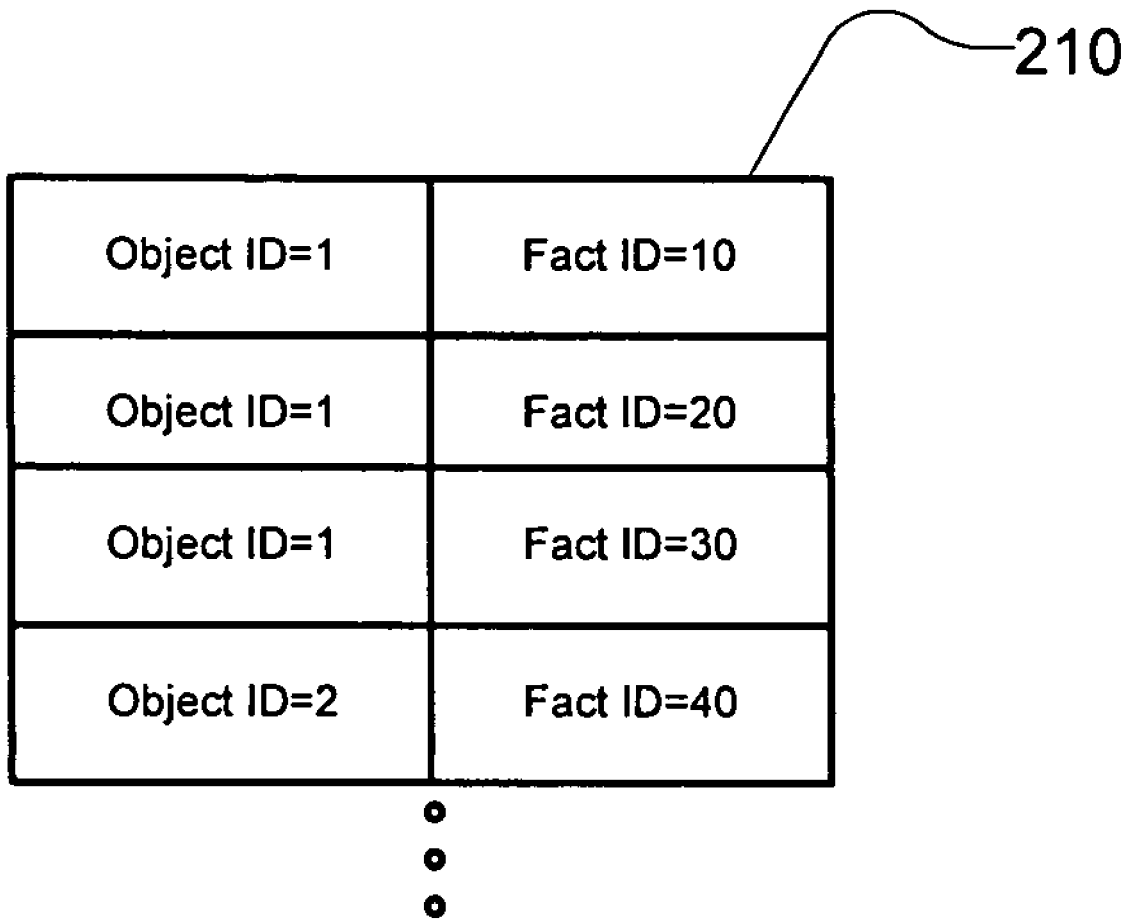

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
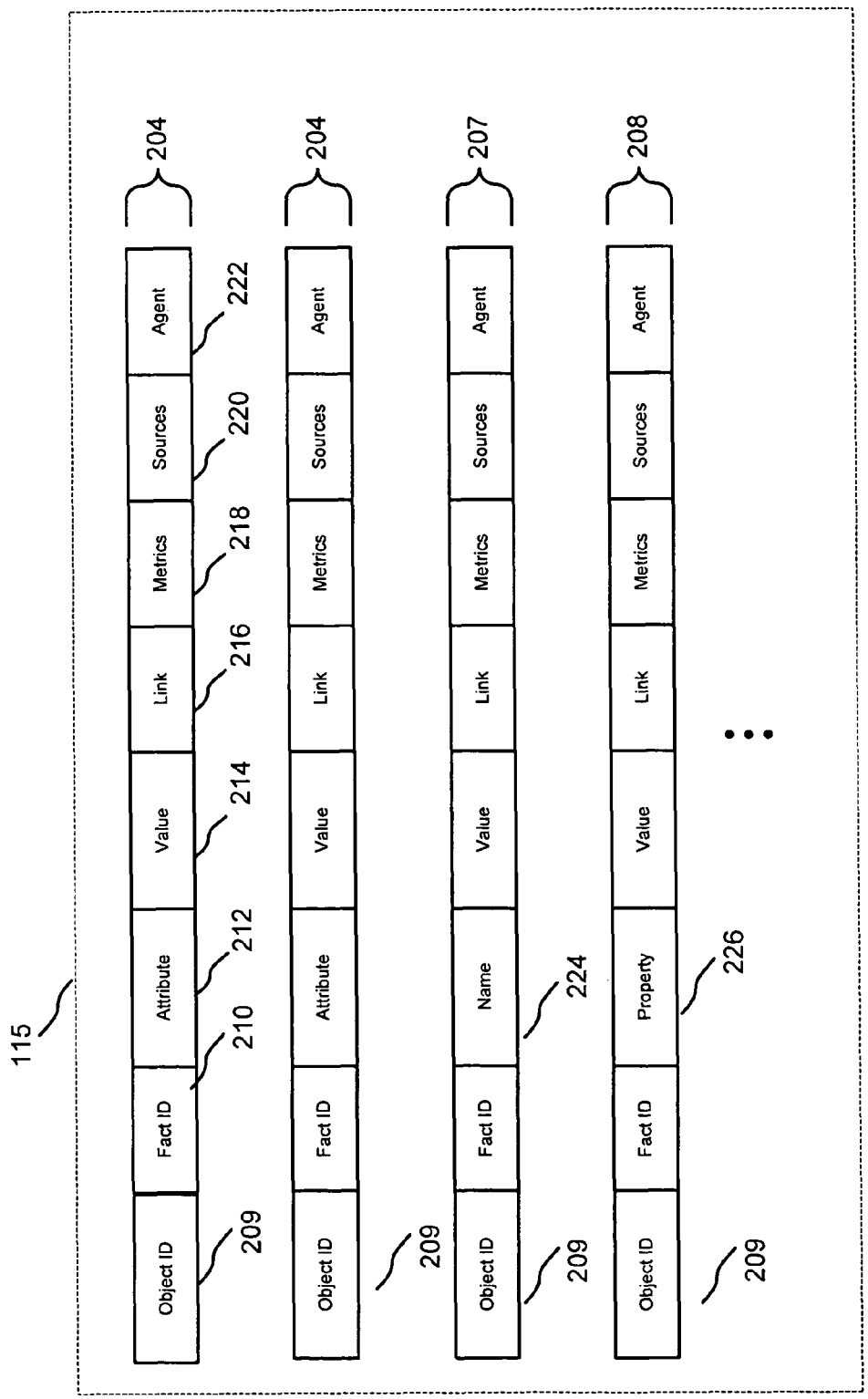

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact.

In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
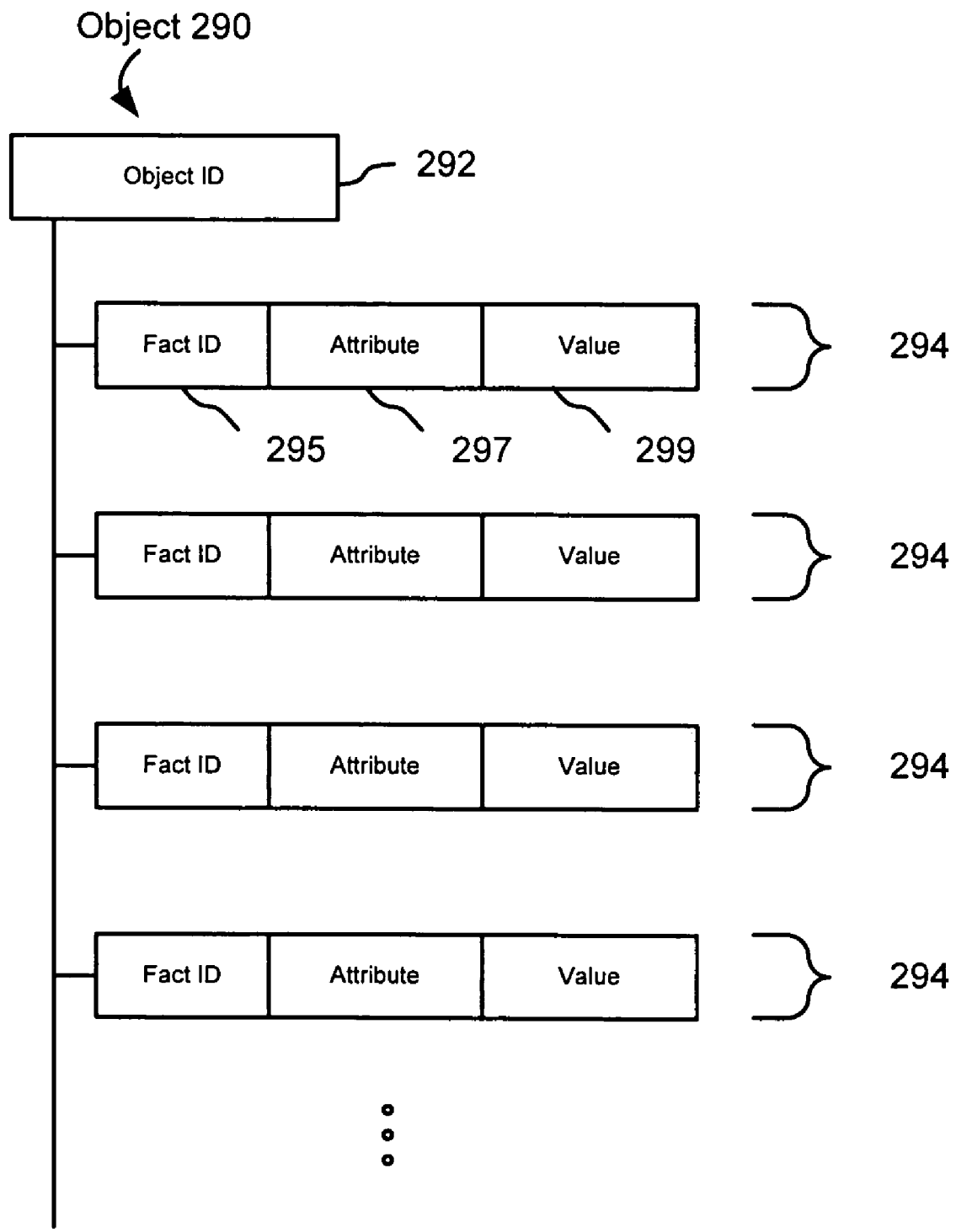
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

It should be understood that the following discussion mentions "objects." In one embodiment of the invention, objects are conceptual and are physically embodied as object IDs associated with one or more facts. Thus, while the discussion below mentions "objects," it will be understood that actually, each object includes one or more facts in repository 115, each fact having an object ID for the object. In other embodiments, objects are physically embodied and can be discussed as physical entities. The discussion below can be used in either for conceptual objects or physical objects.

FIG. 3(a) is an illustration of an object persistence problem caused by repeated builds. Build A 301 illustrates a first build of the collection of data. The importer 302, janitor 304, build engine 306, and service engine 308 may function as previously described herein with reference to FIG. 1. The importer 302, janitor 304, and build engine 306 result in the creation of a Repository A 310 that contains objects. The objects in the Repository A 310 have object IDs, which in turn may be used either externally or internally to reference their corresponding objects.

Build B 311 illustrates a second build of the collection of data. The importer 312 may function as previously described herein with reference to FIG. 1. The importer 312 may operate on updated source documents, different source documents, or the same source documents. The results produced by the importer 312 may differ from the results produced by the importer 302 because of differences between the method of the importer 312 and the method of the importer 302. The results may also differ because more, less, or updated sources were used to create the builds. In one embodiment, all objects in the second build receive a new object ID, even if those objects existed in the previous build. The janitor 314, build engine 316, and service engine 318 may function as previously described herein with reference to FIG. 1. The importer 312, janitor 314, and build engine 316 result in the creation of a Repository B 320. For the purposes of illustration, the output of the first build (Repository A 310) is shown as being distinct from the output of the second build (Repository B 320). In practice, these repositories may be implemented using a shared data store, or they may be implemented as a single repository, such that the data in Repository A are stored alongside data in Repository B.

Without a mechanism for maintaining object ID persistence, subsequent builds may not be able to capitalize on the information stored in prior builds. The service engine 308 may not be able to respond to requests identified by object IDs in the object Repository B 320, and the service engine 318 may not be able to respond to requests identified by object IDs in the Repository A 310. Furthermore, in the case in which object Repository B 320 stores updated information with respect to the information stored in object Repository A 310, requests for object IDs previously stored in the object Repository A 310 may not return the most complete and accurate information possible. It is desirable for information relating to an entity to be accessible whether it exists as a result of the first build or as a result of the second build.

FIG. 3(b) is an illustration of the generation of two collections of information with ID persistence maintained by a janitor, according to one embodiment of the present invention. Build A 301 illustrates a first build of the collection of data. The importer 302, janitor 304, build engine 306, and service engine 308 may function as previously described herein with reference to FIG. 1. The importer 302, janitor 304, and build engine 306 result in the creation of a Repository A 310. The objects in the Repository A 310 have object IDs, which in turn may be used either externally or internally to reference their corresponding objects.

Build C 321 illustrates a second build of the collection of data. The importer 322 may function as previously described herein with reference to FIG. 1. The importer 322 may operate on updated source documents, different source documents, or the same source documents. The results produced by the importer 322 versus the results produced by the importer 302 may be different due to differences between the method of the importer 322 and the method of the importer 302.

The janitor 324 includes an ID persistence janitor. The build engine 326 may function as previously described herein with reference to FIG. 1. The importer 322, janitor 324, and build engine 326 result in the creation of the Repository C 330.

According to one embodiment of the present invention, the ID persistence janitor operates on the objects that result from the importer 322 (from Build C) and the objects contained in the Repository A 310 (from Build A) to provide persistent object IDs across builds for those objects that refer to the same entity. According to one embodiment of the present invention, the ID persistence janitor may access the objects contained in Repository A 310 through the service engine 308. By providing persistent object IDs across builds for objects referring to the same entity, the ID persistence janitor allows internal or external references to object IDs in either new or preexisting collection of objects to be successfully serviced. For example, the service engine 328 may be able to respond to requests identified by object IDs previously contained in the object Repository A 310 and to requests identified by object IDs in the Repository C 330. Object IDs previously contained in either repository will retrieve the most complete and accurate information available for the entity to which that object ID corresponds. Furthermore, as one build may have operated on documents from a first source and the other build may have operated on documents from a second source, the operation of the ID persistence janitor may be beneficial for combining information from a plurality of sources. Such combination may be useful, for example, for verifying or supplementing information to gain information more accurate or exhaustive than information available from any single source.

For the purposes of illustration, the output of the first build (Repository A 310) is shown as being distinct from the output of the second build (Repository C 330). In practice, these repositories may be implemented using a shared data store, or they may be implemented as a single repository, such that the data in Repository A are stored alongside the data in Repository B. The method of the ID persistence janitor is described in greater detail herein with reference to FIGS. 4-6.

FIG. 3(c) is an illustration of the generation of two collections of information with ID persistence maintained by a janitor, according to another embodiment of the present invention. The janitor 325 includes an ID persistence janitor. The ID persistence janitor receives objects from the Repository A 310 from the service engine 308 and objects from the Repository C 330 from the service engine 328. The ID persistence janitor may then make modifications to the object in the Repository C 330. According to one embodiment of the present invention, the ID janitor may store its results in a new repository, for example, a Repository D not shown.

FIG. 3(d) is an example of how ID persistence can be achieved across collections of objects by use of a janitor, according to one embodiment of the present invention. In FIG. 3(d) objects are depicted as circles or squares, and references to objects are depicted as arrows. According to one embodiment of the present invention, references to objects may be implemented as object reference links, for example as described herein with reference to FIG. 2. For the purposes of illustration, objects are shown as discrete entries within a larger collection of objects. As described herein, according to one embodiment of the present invention objects may exist only as a set of facts having the same object ID. Objects are illustrated and discussed herein as entities actually existing in memory to more clearly explain ID persistence across various collections of objects or facts, but it is understood that the invention is applicable to any structure of object, for example one of the structures described herein with reference to FIG. 2.

A new collection of objects 332 is shown with member Objects A, B, and C. Object A includes a reference to Object B and Object B includes a reference to Object C. A reference from an external source (i.e., an external reference), refers to Object B and represented by an X. In the Figure, internal references are shown by solid lines, external references are shown by dashed lines, and forwarding references are shown by dotted lines.

An old collection of objects 334 has Objects D, E, F, and G. Object D includes a reference to Object E, Object E includes a reference to Object F, Object F includes a reference to Object G, and Object G includes a reference to Object D. Several external references refer to Objects D and E.

In the example shown, Object B of the new collection of objects 332 "matches" Object D of the old collection of objects 334. Herein, the term "match" means that Object B and Object D refer to the same entity. They may or may not be associated with the same set of facts. A match may exist when one object is associated with data that updates, supplements, supersedes, or replaces the data associated with a second object. In the example shown it may be desirable to combine Objects B and D, replace one with the other, or otherwise eliminate duplicate information so that the resulting collection of objects contains the most complete data available with minimal redundancy.

Neither Object B nor Object D can be eliminated entirely, as both are referred to by both internal and external references. For example, if Object B was deleted, neither the external reference to Object B nor the internal reference from Object A could be successfully used to retrieve information related to Object A or Object B, and the reference to Object C would also be lost. Similarly, Object D is intimately connected in a network of references between objects, and is referred to by several external references. Deleting Object D would break these references. Thus removing either Object B or Object D produces an undesirable result.

Ignoring the match between Object B and Object D introduces the possibility of referring to redundant or out-of date data. For example, if Object B is identical to Object D, then their associated data is replicated, resulting in an inefficient use of storage capacity. As another example, if Object B is associated with data that supersedes the data associated with Object D, then Object G and several external references will continue to refer to out-of-date data. Existing references to Object D will not lead to the latest data, which is associated with Object B. Thus ignoring matches also produces an undesirable result.

The ID persistence janitor operates on the new collection of objects 332 and the old collection of objects 334 to produce a collection of objects with object identifier persistence 336. In the collection of objects with identifier persistence 336, matching objects have been detected and processed appropriately, thereby maintaining ID persistence and creating an efficient and up-to-date collection of objects.

In the example illustrated, Object B matches Object D. In the collection of objects with identifier persistence 336, Object B (represented by a square) has been modified so that references to Object B will forward to Object D. This is sometimes called a forwarding fact or a forwarding reference. In one embodiment, the service engine 114 determines that a referenced object has a forwarding fact and also retrieves the object referenced by the forwarding fact so that it can be returned. For example, if the service engine attempts to follow the external reference to B, the service engine will find the forwarding fact to Object D. Thus the object identifier of Objects B and D persist in the data collection. According to one embodiment of the present invention, the data of Object B in the new collection of objects 332 is moved to Object D in the collection of objects with identifier persistence 336. Thus Object B in the collection of objects with identifier persistence 336 is empty, saving storage space and resulting in more efficient data storage.

The identifier for Object D is also included in the collection of objects with identifier persistence 336. Thus the object identifier of Object D persists across the new build.

Additionally, according to one embodiment of the present invention, the reference in Object A to Object B is modified so that it refers to Object D instead of Object B. Thus an attempt to follow the reference in Object A may skip the step of forwarding from Object B and go directly to Object D.

The example depicts Object B forwarding to Object D. This example was chosen for the purposes of illustration. According to another embodiment of the present invention, Object D would instead forward to Object B and the facts associated with Object D would be moved to Object B. According to another embodiment of the present invention, a new object, Object H, would be created, and all facts from both Object B and Object D would be moved to Object H, and forwarding references would be created from Object B to Object H and from Object D to Object H.

As a result of ID persistence, new and existing references to objects in the collections may be used to access all available information for an entity.

FIG. 4 is an illustration of the flow of data in an ID persistence janitor, according to one embodiment of the present invention. The ID persistence janitor 406 is a type of janitor, janitors being described herein with reference to FIG. 1. According to one embodiment of the present invention, the ID persistence janitor 406 operates on a collection of objects 402 and a merge object 404 to produce a merged collection of objects with persisting references 408.

According to one embodiment of the present invention, the collection of objects 402 is analogous to the output of the importer 322 described herein with reference to FIG. 3(b) and the merge object 404 is analogous to one of the objects in the object Repository A 310 described herein with reference to FIG. 3(b). According to one embodiment of the present invention, the ID persistence janitor 406 may be run multiple times with different merge objects 404, until every object in an object repository, for example the object Repository A 310 described herein with reference to FIG. 3(b), has been run through the object merge janitor 406. A service engine may be used to retrieve merge objects 404.

According to one embodiment of the present invention, the ID persistence janitor may compare objects within subsets as described in U.S. application Ser. No. 11/356,842, "Modular Architecture for Entity Normalization", an application filed concurrently with this application, which is herein incorporated by reference in its entirety.

According to one embodiment of the present invention, the merge object 404 may be one of the objects contained in the collection of objects 402. Calling the ID persistence janitor for a collection of objects and an object contained in that collection objects may be useful, for example, to ensure that IDs persist consistently within a build, or to create forwarding references between the object IDs of matching objects.

The objects in the collection of objects 402, in the merged collection of objects 408 and the merge object 404 may be structured in a variety of ways. For example they may exist as a set of facts with common object IDs, or they may explicitly exist as objects in memory. Various methods for structuring objects in a collection of data are described herein with reference to FIG. 2.

Object persistence may be useful in a number of circumstances in which two collections of objects are merged: When a new build is executed, when two disparate collections of objects from different sources are merged together, when a new object is added to an existing collection, and so on. Each case introduces the possibility that multiple objects (each having its own object ID) in the collection may correspond to the same entity. The ID persistence janitor 406 beneficially makes all available information for an entity accessible by any one of the object IDs corresponding to that entity.

The method of the ID persistence janitor is described in greater detail herein with reference to FIGS. 5-6.

According to one embodiment of the present invention, the merged collection of objects contains the object ID of the merge object 404 and all of the object IDs contained in the collection of objects 402. The merged collection of object with persisting references 408 may contain the same number of objects as the collection of objects 402, for example, if the object ID of the merge object 404 is already contained in the collection of objects 402. The merged collection of object with persisting references 408 may contain a different number of objects as the collection of objects 402, for example, if the object ID of the merge object 404 is not already contained in the collection of objects 402.

According to one embodiment of the present invention, the merged collection of objects with persisting references 408 contains the facts of the union of the collection of objects 402 and the merge object 404. According to one embodiment of the present invention, the facts added by the merge object 404, if any, will be accessible by the object ID of the merge object 404. Similarly, according to one embodiment of the present invention, each object in the merged collection of objects with persisting references 408 may be accessed by the same object ID as the corresponding object in the collection of objects 402. According to one embodiment of the present invention, the ID persistence janitor 406 stores objects and facts from a first repository into a second repository, while ensuring that the objects and facts originating from both repositories remain accessible by their prior object ID or associated object ID. The persistence of identifiers (such as object IDs) across builds is beneficial for the continued operation of external and internal applications making reference to the objects of the collection of data.

FIGS. 5(*a*)-5(*c*) illustrate an example of maintaining persistent identifiers, according to several of the various embodiment of the present invention. 501 depicts an object before the operation of the ID persistence janitor 406. According to one embodiment of the present invention, Object A depicted in 501 may be analogous to the merge object 404 described herein with reference to FIG. 4. Object A is associated with some facts, for example, Fact 1, Fact 2, and Fact 3.

FIG. 5(*a*) depicts a collection 502 of objects before the operation of the ID persistence janitor 406. According to one embodiment of the present invention, the objects depicted in 502 may be analogous to the collection of objects 402 described herein with reference to FIG. 4. Object B is associated with some facts, for example, Fact 4, Fact 5, and Fact 6. Object C is associated with a pointer (for example, either an object reference link or a forwarding reference) to Object B. According to one embodiment of the present invention, the pointer may be implemented using a special fact associated with Object C, such as a forwarding fact.

Object A is an object in a collection 501 of objects before the operation of the ID persistence janitor 406. According to one embodiment of the present invention, the object depicted in 501 may be analogous to the merge object 404 described herein with reference to FIG. 4. For the purposes of illustration Object A is depicted as being the only object in the collection of objects 501; in practice any number of objects could be stored in the collection of objects 501, and Object A may be representative of a plurality of objects operated on by the ID persistence janitor.

According to another embodiment of the present invention, Objects A, B, and C belong to the same collection of objects, and the ID persistence janitor 406 operates on a collection of objects 402 and a merge object 404, wherein the merge object 404 is a member of the collection of objects 402.

FIG. 5(*b*) depicts a collection 504 of objects after the operation of the ID persistence janitor, according to one embodiment of the present invention. According to one embodiment of the present invention, the objects depicted in 504 may be analogous to the merged collection of objects with persisting references 408 as described herein with reference to FIG. 4.

FIG. 5(*b*) depicts a case in which the ID persistence janitor 406 has determined that Object A matches Object B. According to one embodiment of the present invention, this determination may be made on the basis of the facts associated with Object A and the facts associated with Object B. The facts associated with Object B—Fact 4, Fact 5, and Fact 6—are moved from Object B to Object A. The facts previously associated with Object B are now associated with Object A.

Facts can be moved from one object to another using a variety of methods. For example, a fact can be modified by copying or moving it from Object B to Object A. According to one embodiment of the present invention, an internal property of the fact can be modified to indicate that the fact describes Object A instead of Object B, for example, by storing the object ID of Object A in the fact. Thus, the record of which object a fact describes could be modified without the need to reproduce the fact.

The facts of Object A and the facts of Object B are modified so that they are associated with a single object. In this case, the facts were modified so they are associated with Object A. According to various implementations, the determination as to which object between two matching objects a group of facts should be associated with may be made in a variety of ways. According to one embodiment of the present invention, the group of facts are associated with the object having the older object ID. By associating the group of facts with the object having the older object ID, the likelihood of long forwarding reference chains can be reduced, thereby improving the efficiency of the organization of objects.

The facts previously associated with Object B are now associated with Object A. However, there may exist prior references to Object B, and internal or external applications may be depending on those references to be able to return to the prior set of facts. For example, Object C is associated with a pointer to Object B. It is desirable that the references to Object B (such as the object ID for Object B and the pointer from Object C) continue to persist. Therefore, it may be desirable to add a reference from Object B to Object A.

In the interest of having references to Object B continue to persist, the ID persistence janitor 406 stores forwarding information from Object B to Object A. In 504, Object B is associated with a pointer to Object A. According to one embodiment of the present invention, this pointer may be implemented as a special fact associated with Object B, such as a forwarding fact.

Thus an attempt to retrieve, for example, Fact 5, on the basis of a prior reference to Object B (for example, by using the object ID of object B) will be successful. Object B is no longer associated with Fact 5, but Object B is associated with a pointer to Object A, which in turn is associated with Fact 5. Similarly, an attempt to retrieve, for example, Fact 6, on the basis of a prior reference to Object C (for example, by using the object ID of Object C) will be successful. Object C is not associated with Fact 6, but Object C is associated with a pointer to Object B, which is associated with a pointer to Object A, which in turn is associated with Fact 6.

For the purposes of illustration, Object A is depicted as being associated with Facts 1-6. According to one embodiment of the present invention, all the facts of the two matching objects are modified so that they are associated with a single object. However, according to another embodiment of the present invention, redundant facts are eliminated where they exist. For example, if Fact 1 was identical to Fact 4 and Fact 2 was identical to Fact 6, after the operation of the ID persistence janitor only Facts 1-3 and Fact 5 might me associated with Object A. Additionally, Fact 4 and Fact 6 could be marked as "deleted" in the repository.

FIG. 5(*c*) depicts a collection 506 of objects after the operation of the ID persistence janitor, according to one embodiment of the present invention. 506 illustrates the effect of an additional optimization step in the ID persistence janitor 406. According to one embodiment of the present invention, after performing the method as described herein with reference to 504, the ID persistence janitor 406 cleans up existing references to the merged object. For example, in 506, the pointer associated with Object C is modified to point to Object A instead of Object B. Cleaning up existing references allows for more direct access to the facts previously associated with that reference. For example, an attempt to access Fact 6 on the basis of a prior reference to Object C would be more directly fulfilled if the objects were in the state depicted in 506 than the state depicted in 504. Object C is not associated with Fact 6, but Object C is associated with a pointer to Object A, which in turn is associated with Fact 6. Thus, in the example illustrated, otherwise unnecessary accesses to Object B are eliminated by cleaning up existing references. Cleaning up existing references is beneficial for improving the performance of the resulting collection of objects. References may be cleaned up, for example, by modifying pointers, forwarding facts, and object reference links to an outdated object to refer to the same destination object as the forwarding fact of the outdated object.

According to one embodiment of the present invention, if the acquisition of facts at a later point in time or additional analysis by a janitor results in a determination that Object A and Object D do not in fact match, the object ID persistence janitor (or another janitor) takes steps to undo the merge. The object ID persistence janitor removes the pointer from Object B to Object A, and restores to Object B the facts originally associated with Object B. The object ID persistence janitor may determine which facts were originally associated with Object B, for example, by analyzing source information of the respective facts, and/or consulting records of the previous actions of the object ID persistence janitor. Facts whose original association is ambiguous may be removed. Additionally, the object ID persistence janitor may undo the cleaning up of existing references described herein with reference to FIG. 3(c) by restoring pointers so that they refer to the same objects they did before the merge.

FIG. 6 is a flow chart illustrating a method for maintaining object ID persistence across builds, according to one embodiment of the present invention. According to one embodiment of the present invention, the method is performed by the ID persistence janitor 406. For the purposes of illustration, the ID persistence janitor 406 is shown as iterating over various combinations of objects from a first collection and objects from a second collection. In practice, the ID persistence janitor 406 may be optimized to find matching objects across various collections using methods such as those described in the U.S. Patent Application "Modular Architecture for Entity Normalization" incorporated above.

According to one embodiment of the present invention, the ID persistence janitor 406 receives 602 a list of object identifiers (object IDs) of existing objects. The list contains a number of object IDs. For the purposes of illustration, the number of objects IDs in the received 602 list of objects is referred to as M. According to one embodiment of the present invention, receiving 602 the list of object IDs may additionally include receiving facts associated with those object IDs.

The ID persistence janitor 406 receives 604 an object ID of a new object. For the purposes of illustration, this object ID is referred to as Object ID A. According to one embodiment of the present invention, receiving 604 an object ID of a new object may additionally include receiving facts associated with that object ID. According to one embodiment of the present invention, Object ID A may also be contained in the list of object IDs of existing objects received 602 by the ID persistence janitor 406.

The ID persistence janitor 406 initializes a counter variable, which for the purposes of illustration will be called n, to the value of 1.

Using the counter variable n, the ID persistence janitor 406 selects 606 the nth object ID from the received 602 list of object IDs of existing objects. For the purposes of illustration, this nth object ID is referred to as Object ID B.

The ID persistence janitor 406 performs 608 an ID persistence method on Object ID A and Object ID B. According to one embodiment of the present invention, ID persistence may be performed by an ID persistence function. A method for performing ID persistence, according to one embodiment of the present invention, will be described in greater detail herein with reference to FIG. 7.

The ID persistence janitor 406 determines 610 if the counter variable, n, is equal to the number of object IDs in the received 602 list of existing objects, M. If the ID persistence janitor 406 determines 610 that the counter variable, n, is equal to the number of object IDs in the received 602 list of existing objects, M, ID persistence has been performed on every object ID in the received 602 list of existing objects, and the ID persistence janitor 406 is finished. The ID persistence janitor 406 returns 612.

If the ID persistence janitor 406 determines 610 that the counter variable, n, is not equal to the number of object IDs in the received 602 list of existing objects, M, the ID persistence janitor 406 increments the counter variable, n, and returns to select 606 the nth object ID from the list. Thus the ID persistence janitor 406 loops until it has performed 608 the ID persistence method on the combination of Object ID A and every ID on the received 602 list of object IDs of existing objects. By applying the ID persistence method for various combinations of objects, the ID persistence janitor 406 ensures identifier persistence across a variety of objects.

FIG. 7 is a flow chart illustrating a method for performing ID persistence, according to one embodiment of the present invention. According to one embodiment of the present invention, the method is performed by an ID persistence function.

The ID persistence function receives 704 two object IDs. For the purposes of illustration, one of these object IDs will be referred to as object ID A and the other will be referred to as object ID B.

The ID persistence function retrieves 706 facts relating to object ID A. For the purposes of illustration, these facts will be referred to as Facts A.

The ID persistence function retrieves 708 facts relating to object ID B. For the purposes of illustration, these facts will be referred to as Facts B.

According to one embodiment of the present invention, Facts A and Facts B are received 704 along with object ID A and object ID B. Thus, according to one embodiment of the present invention, the steps of retrieving 706 facts relating to object ID A and retrieving 708 facts relating to object ID B are optional.

The ID persistence function performs 710 a heuristic comparison on Facts A and Facts B. According to one embodiment of the present invention, the heuristic comparison may be performed by a heuristic comparison function. An example of how a heuristic comparison function, according to one embodiment of the present invention, might classify various pairs of objects as matching or non-matching is described herein with reference to FIGS. 8(a)-8(d).

The heuristic comparison function returns data indicating whether the object associated with Facts A matches the object associated with Facts B. The ID persistence function determines 712 if the heuristic comparison function has returned data indicating that the object associated with Facts A matches the object associated with Facts B. If the ID persistence function determines 712 that the heuristic comparison function has returned data indicating that the object associated with Facts A does not match the object associated with Facts B, the ID persistence function returns 714.

On the other hand, if the ID persistence function determines 712 that the heuristic comparison function has returned data indicating that the object associated with Facts A matches the object associated with Facts B, the ID persistence function changes 716 Facts B so that are associated with the object with Object ID A instead of the object with Object ID B. Several methods for changing the object associated with facts is described previously herein with reference to FIG. 5.

The ID persistence function stores 718 forwarding information from the Object ID B to Object ID A. According to one embodiment of the present invention, the ID persistence function associates with Object ID B a forwarding fact to Object ID A. Several methods for forwarding references to objects are described herein with reference to FIG. 5.

According to one embodiment of the present invention, the ID persistence function cleans up 720 existing references to Object ID B and returns 714. Cleaning up existing references is described in greater detail herein with reference to FIG. 5.

The ID persistence returns 714.

According to one embodiment of the present invention, object ID A is defined to be the older of the two received object IDs. Therefore, according to one embodiment of the present invention, when two objects are determined to match, their facts are modified to be associated with the object having the older object ID and the object having the younger object ID is associated with a pointer to the object having the older object ID. One skilled in the art will recognize that various methods can be implemented for defining one of the received object IDs as object ID A and the other as object ID B without departing from the scope of the present invention.

FIGS. 8(a)-8(d) show examples of different pairs of objects and how they might be classified as matching or non-matching by the heuristic comparison function, according to one embodiment of the present invention. According to one embodiment of the present invention, the heuristic comparison function compares two sets of facts to determine if they describe the same object.

FIG. 8(a) depicts two matching objects 802. The attributes and values of the facts associated with a first object, Object A, are listed on the left, and the attributes and values of the facts associated with a second object, Object B, are listed on the right. While the facts are organized in a different order, the facts associated with Object A happen to be identical to the facts associated with Object B such that it can reasonably be concluded that Object A is the same entity as Object B, that is, Object A matches Object B. In this case, according to one embodiment of the present invention the heuristic comparison function would return positively, that is, it would return data indicating that the two objects match. In one embodiment, it is accurate to say that the facts have the same attributes and values.

FIG. 8(b) depicts two non-matching objects 804. The attributes and values of the facts associated with a first object, Object A, are listed on the left, and the attributes and values of the facts associated with a second object, Object B, are listed on the right. No fact associated with Object A is at all similar to any fact associated with Object B. In this case, according to one embodiment of the present invention the heuristic comparison function would return negatively, that is, it would return data indicating that the two objects do not match. In one embodiment, it is accurate to say that the facts do not have the same attributes or, if they do, that the values of the facts having the same attributes do not match.

FIG. 8(c) depicts a more challenging case of two matching objects 806. The attributes and values of the facts associated with a first object, Object A, are listed on the left, and the attributes and values of the facts associated with a second object, Object B, are listed on the right. Some of the facts associated with Object A are similar to the facts associated with Object B (for example, "Title: Emperor of Russia" and "Name: Nikolai [I] Pavlovich") but other facts associated with Object A are not similar to the facts associated with Object B (for example, "Title: Grand Duke of Finland" vs. "Title: King of Poland" and "Birth date: 7/6/1796" vs. "Birth date: 6/25/1796"). In sum, however, the objects in fact represent the same entity (in this case a person), and it may be desirable to conclude that Object A matches Object B. In this case, according to one embodiment of the present invention the heuristic comparison function would return positively, that is, it would return data indicating that the two objects match. In one embodiment, it is accurate to say that the facts have some acceptable level of match between their attributes and that the facts with matching attributes have some acceptable level of match between their values.

FIG. 8(d) depicts a more challenging case of two non-matching objects 808. The attributes and values of the facts associated with a first object, Object A, are listed on the left, and attributes and values of the facts associated with a second object, Object B, are listed on the right. Some of the facts associated with Object A are similar to the facts associated with Object B (for example, "Title: Emperor of Russia") but other facts associated with Object A are not similar to the facts associated with Object B (for example, "Name: Nicholas II of Russia" vs. "Name: Nikolai I Pavlovich" and "Birth date: 5/18/1868" vs. "Birth date: 5/25/1796"). In sum, the two objects in fact represent different entities (inthis case, two different people) and it may desirable to conclude that that Object A does not match Object B. In this case, according to one embodiment of the present invention the heuristic comparison function would return negatively; that is, it would return data indicating that the two objects do not match. In one embodiment, it is accurate to say that the facts lack some acceptable level of match between their attributes or, that if they have an acceptable level of match between their attributes, they lack some acceptable level of match between their values.

The objects and facts listed in FIGS. 8(a)-8(d) are examples given for the purpose of illustration and are not limiting to the scope of the present invention. The present invention is applicable to any kind of object and any kind of fact. According to one embodiment of the present invention, the determination as to whether two objects match may be made on the basis of any combination of the objects and/or the facts associated with either or both of those objects.

Determining if two objects match using a heuristic comparison function is beneficial, as it allows matching objects to be combined or cross-referenced for the purposes of reducing redundant data, updating data, and reliably performing ID persistence.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for maintaining object ID persistence in a collection of data, comprising:
   at a computer system including one or more processors and memory storing one or more programs, the one or more processors executing the one or more programs to perform the operations of:
   selecting a first object from the collection of data having a first object ID, wherein a first fact comprising an associated object ID is associated with the first object, the collection of data includes a plurality of objects and a plurality of facts associated with the objects, each fact comprises an attribute-value pair, and the plurality of facts are extracted from a plurality of web documents;
   selecting a second object from the collection of data having a second object ID;
   performing a heuristic comparison on the first object and the second object to determine if the first object and the second object refer to a same entity;
   responsive to determining that the first object and the second object refer to the same entity,
      associating with the first object a forwarding reference to the second object, so that the second object can be referenced using the first object ID;
      dissociating the first fact from the first object; and
      associating the first fact with the second object by setting the associated object ID of the first fact to the second object ID, so that the first fact is merged with facts for the second object; and
   responsive to receiving an external reference to the first object,
      identifying that the first object includes a forwarding reference to the second object; and
      retrieving the second object.

2. The method of claim 1, wherein a second fact is associated with the second object, and wherein determining if the first object and the second object refer to the same entity comprises comparing the first fact to the second fact to determine if the first object matches the second object.

3. The method of claim 2, wherein the first fact is compared to the second fact by a heuristic comparison function.

4. The method of claim 2, further comprising:
   responsive to determining that the first object matches the second object, associating with the first object a forwarding reference to the second object, so that the second fact may be accessed by referring to the first object ID.

5. The method of claim 1, wherein a first plurality of facts is associated with the first object and a second plurality of facts is associated with the second object, and wherein determining if the first object and the second object refer to the same entity comprises comparing the first plurality of facts to the second plurality of facts to determine if the first object matches the second object.

6. The method of claim 1, wherein a forwarding reference to the first object is associated with a third object, the method further comprising:
responsive to determining that the first object and the second object refer to the same entity, modifying the forwarding reference to the first object so that it points to the second object.

7. The method of claim 1, wherein the first object is contained in a first collection of data and wherein the second object is not contained in the first collection of data.

8. The method of claim 1, wherein the second object is contained in a first collection of data and wherein the first object is not contained in the first collection of data.

9. The method of claim 1, wherein the first object is contained in a first collection of data, and wherein the steps are performed by a janitor operating before a build of the first collection of data.

10. The method of claim 1, wherein the second object is contained in a first collection of data, and wherein the steps are performed by a janitor operating before a build of the first collection of data.

11. A computer readable storage medium for maintaining object ID persistence in a collection of data, the computer readable storage medium storing one or more programs for execution by one or more processors in a computer system, the one or more programs comprising:
instructions for selecting a first object from the collection of data having a first object ID, wherein a first fact comprising an associated object ID is associated with the first object, the collection of data includes a plurality of objects and a plurality of facts associated with the objects, each fact comprises an attribute-value pair, and the plurality of facts are extracted from a plurality of web documents;
instructions for selecting a second object from the collection of data having a second object ID;
instructions for performing a heuristic comparison on the first object and the second object to determine if the first object and the second object refer to a same entity;
instructions for, responsive to determining that the first object and the second object refer to the same entity,
associating with the first object a forwarding reference to the second object, so that the second object can be referenced using the first object ID;
dissociating the first fact from the first object; and
associating the first fact with the second object by setting the associated object ID of the first fact to the second object ID, so that the first fact is merged with facts for the second object; and
program code for, responsive to receiving an external reference to the first object,
identifying that the first object includes a forwarding reference to the second object; and
retrieving the second object.

12. A system for maintaining object ID persistence in a collection of data, comprising:
one or more processors;
memory; and
one or more programs stored in the memory, the one or more programs comprising instructions to:
select a first object from the collection of data having a first object ID, wherein a first fact comprising an associated object ID is associated with the first object, the collection of data includes a plurality of objects and a plurality of facts associated with the objects, each fact comprises an attribute-value pair and the plurality of facts are extracted from a plurality of web documents;
select a second object from the collection of data having a second object ID;
perform a heuristic comparison on the first object and the second object to determine if the first object and the second object refer to a same entity; and
responsive to determining that the first object and the second object refer to the same entity,
associate with the first object a forwarding reference to the second object, so that the second object can be referenced using the first object ID;
dissociate the first fact from the first object; and
associate the first fact with the second object by setting the associated object ID of the first fact to the second object ID, so that the first fact is merged with facts for the second object; and
responsive to receiving an external reference to the first object,
identify that the first object includes a forwarding reference to the second object; and
retrieve the second object.

13. A computer-implemented method for maintaining object ID persistence in a collection of data, comprising:
at a computer system including one or more processors and memory storing one or more programs, the one or more processors executing the one or more programs to perform the operations of:
selecting a first set of one or more facts from the collection of data associated with a first object ID, the collection of data includes a plurality of objects and a plurality of facts associated with the objects, each fact comprises an attribute-value pair and the plurality of facts are extracted from a plurality of web documents;
selecting a second set of one or more facts from the collection of data associated with a second object ID;
performing a heuristic comparison on the first set of one or more facts and the second set of one or more facts to determine if the first set of one or more facts associated with the first object ID and the second set of one or more facts associated with the second object ID refer to a same entity;
responsive to determining that the first set of one or more facts associated with the first object ID and the second set of one or more facts associated with the second object ID refer to a same entity and:
associating with the first object ID a forwarding reference to the second object ID, so that the second set of one or more facts associated with the second object ID can be referenced using the first object ID, and dissociating the first set of one or more facts from the first object ID; and
associating the first fact with the second object by setting the associated object ID of the first fact to the second object ID, so that the first fact is merged with facts for the second object; and
responsive to receiving an external reference to the first object ID, identifying that the first object ID includes a forwarding reference to the second object ID and retrieving the second object ID.

14. The method of claim 13, wherein determining if the first set of one or more facts associated with the first object ID and the second set of one or more facts associated with the second object ID refer to a same entity comprises comparing a fact from the first set of one or more facts to a fact from the second set of one or more facts.

15. The method of claim 13, further comprising:
responsive to determining that the first set of one or more facts associated with the first object ID and the second set of one or more facts associated with the second object ID refer to the same entity, associating with the first object ID a forwarding reference to the second object ID, so that the second set of one or more facts associated with the second object ID may be accessed by referring to the first object ID.

16. The method of claim 13, additionally comprising:
responsive to determining that that the first set of one or more facts associated with the first object ID and the second set of one or more facts associated with the second object ID refer to the same entity, associating a fact from the set of one or more facts associated with the first object ID with the second object ID.

17. The method of claim 13, wherein a forwarding reference to the first object ID is associated with a third object ID, the method further comprising:
responsive to determining that the first set of one or more facts associated with the first object ID and the second set of one or more facts associated with the second object ID refer to the same entity, modifying the forwarding reference to the first object ID so that it points to the second object ID.

18. A computer-implemented method for maintaining object ID persistence in a collection of data, comprising:
at a computer system including one or more processors and memory storing one or more programs, the one or more processors executing the one or more programs to perform the operations of:
performing a heuristic comparison on the first object and the second object to determine if a first object from the collection of data having a first object ID and a second object from the collection of data having a second object ID refer to a same entity, wherein a first fact comprising an associated object ID is associated with the first object, the collection of data includes a plurality of objects and a plurality of facts associated with the objects, each fact comprises an attribute-value pair and the plurality of facts are extracted from a plurality of web documents; and
responsive to determining that the first object and the second object refer to the same entity,
associating with the first object a forwarding reference to the second object, so that the second object can be referenced using the first object ID;
dissociating the first fact from the first object; and
associating the first fact with the second object by setting the associated object ID of the first fact to the second object ID, so that the first fact is merged with facts for the second object; and
responsive to receiving an external reference to the first object,
identifying that the first object includes a forwarding reference to the second object; and
retrieving the second object.

* * * * *